US008103551B2

(12) United States Patent
Saul et al.

(10) Patent No.: US 8,103,551 B2
(45) Date of Patent: Jan. 24, 2012

(54) FASHION MATCHING ALGORITHM SOLUTION

(75) Inventors: Justin Saul, Bothell, WA (US); Arkadiy Dantsker, Bothell, WA (US)

(73) Assignee: Style du Jour, Inc., Bothell, WA (US)

( * ) Notice: Subject to any disclaimer, the term of this patent is extended or adjusted under 35 U.S.C. 154(b) by 292 days.

(21) Appl. No.: 12/182,360

(22) Filed: Jul. 30, 2008

(65) Prior Publication Data
US 2009/0037295 A1    Feb. 5, 2009

Related U.S. Application Data

(60) Provisional application No. 60/953,105, filed on Jul. 31, 2007.

(51) Int. Cl.
*G06Q 30/00* (2006.01)
(52) U.S. Cl. ............... 705/26.1; 705/27.1; 705/26.7; 705/27.2
(58) Field of Classification Search .............. 705/26, 705/27
See application file for complete search history.

(56) References Cited

U.S. PATENT DOCUMENTS

| | | | | |
|---|---|---|---|---|
| 6,434,530 | B1 * | 8/2002 | Sloane et al. | 705/1 |
| 7,346,561 | B1 * | 3/2008 | Devitt et al. | 705/27 |
| 7,398,231 | B2 * | 7/2008 | Wan et al. | 705/26 |
| 2003/0065636 | A1 * | 4/2003 | Peyrelevade | 706/62 |

OTHER PUBLICATIONS

"A glimpse of retail tech future at Prada", [Online]. Retrieved from the Internet: <http://archives.cnn.com/2002/TECH/biztech/11/03/retail.tech.ap/>, (Nov. 3, 2002), 3 pgs.

Arrington, Michael, "Polyvore to tempt fashionistas to create, then spend", [Online]. Retrieved from the Internet: <URL: http://www.techcrunch.com/2007/10/11/polyvore-to-tempt-fasionistas-to-create-then-spend/>, (Oct. 11, 2007), 12 pgs.

Lowensohn, Josh, "Closet Assistant attempts eash Web wardrobe managment, social networking for turtlenecks", [Online]. Retrieved from the Internet: <URL: http://news.cnet.com/8301-17939_109-9838947-2.html?tag=mncol>, (Jan. 2, 2008), 2 pgs.

Nichole, Kristen, "Sears Partners with Meez for Back-to-School Virtual Closet", [Online]. Retrieved from the Internet: <URL: http://mashable.com/2007/08/10/sears-meez/>, (Aug. 10, 2007), 2 pgs.

Wenzel, Elsa, "Shopcasting can flaunt your style, but the wardrobes need help", [Online]. Retrieved from the Internet: <URL: http://news.cnet.com/8301-17939_109-9731990-2.html>, (Jun. 20, 2007), 3 pgs.

Lowensohn, Josh, "Closet Couture gives you a virtual closet with real clothes", [Online]. Retrieved from the Internet <URL: http://news.cnet.com/8301-17939_109-10038413-2.html>, 3 pgs, Webware: Sep. 10, 2008.

* cited by examiner

*Primary Examiner* — Jeffrey A Smith
*Assistant Examiner* — Courtney Stopp
(74) *Attorney, Agent, or Firm* — Clise, Billion & Cyr, P.A.; Tim Clise

(57) ABSTRACT

In one example embodiment, a system and method is illustrated that includes receiving an item choice including a fashion item. The system and method also includes matching the fashion item with an additional fashion item selected from a style matrix, the matching based upon an attribute. Further, the system and method includes transmitting the additional fashion item as part of an outfit match set. Moreover, the system and method includes selecting the fashion item from a digital closet. The system and method includes processing the fashion item to build an attribute association matrix. In addition, the system and method includes comparing the attribute association matrix and the style matrix to determine a match of the fashion item and the additional item.

20 Claims, 20 Drawing Sheets

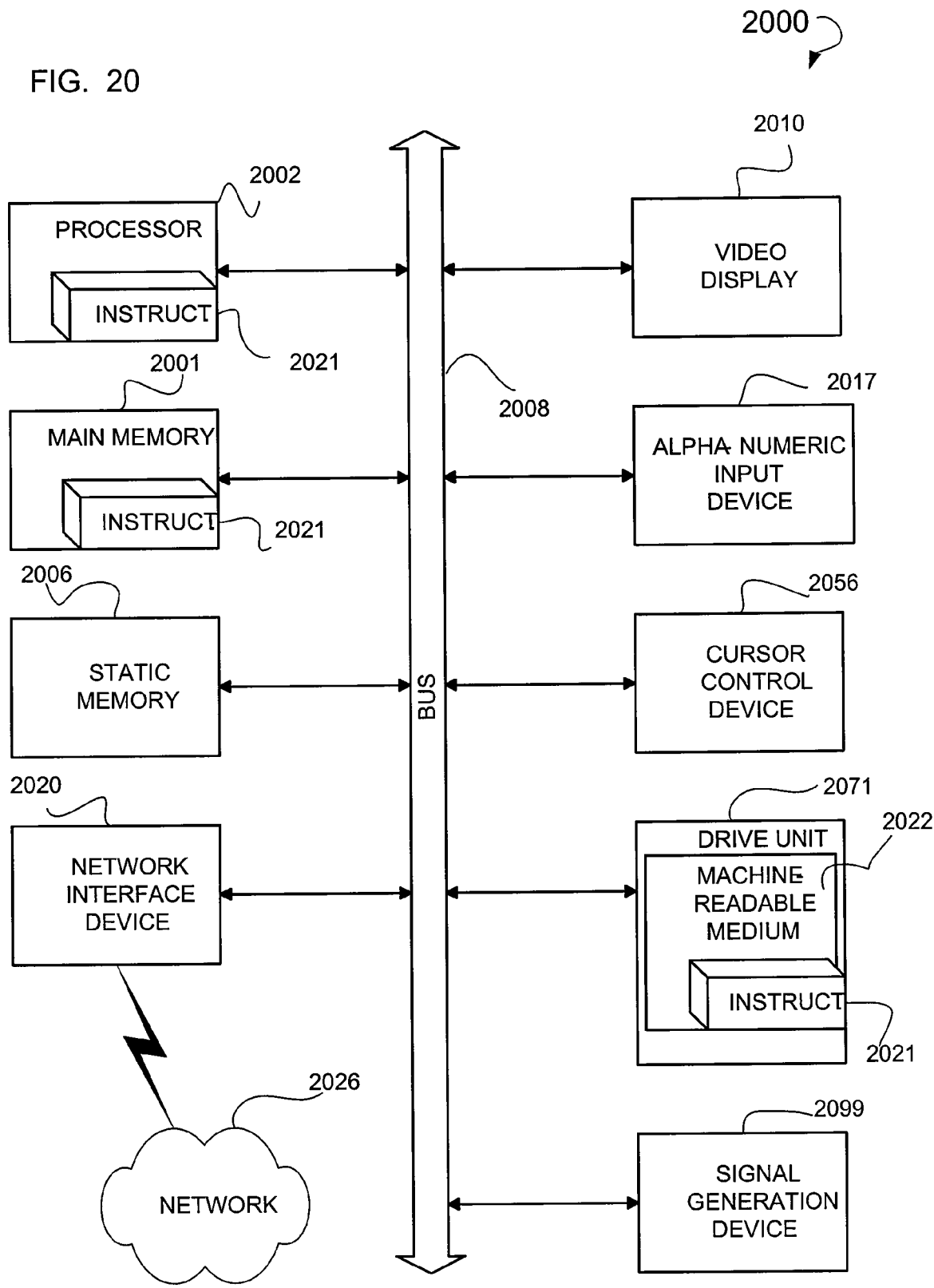

FASHION MATCHING ALGORITHM SOLUTION

CROSS REFERENCE TO RELATED APPLICATIONS

This is a non-provisional patent application claiming priority under 35 USC §119(e) to U.S. Provisional Patent Application No. 60/953,105 filed on Jul. 31, 2007 entitled "FASHION MATCHING METHOD AND SYSTEM," which is incorporated by reference in its entirety.

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2008, Style du Jour, Incorporated. All Rights Reserved.

TECHNICAL FIELD

The present application relates generally to the technical field of algorithms and programming and, in one specific example, searching and matching algorithms.

BACKGROUND

Fashion styles, and fashion items that are part of a style, can be hard to discern. Specifically, it can be hard to discern whether a particular fashion item is associated with a particular fashion style. This can be particularly hard where the fashion item is purchased online or in some format where the fashion item is not physically available for inspection.

BRIEF DESCRIPTION OF THE DRAWINGS

Some embodiments are illustrated by way of example and not limitation in the figures of the accompanying drawings in which:

FIG. 20 shows a diagrammatic representation of a machine in the form of a computer system, according to an example embodiment, that executes a set of instructions to perform any one or more of the methodologies discussed herein.

DETAILED DESCRIPTION

Figure 1:
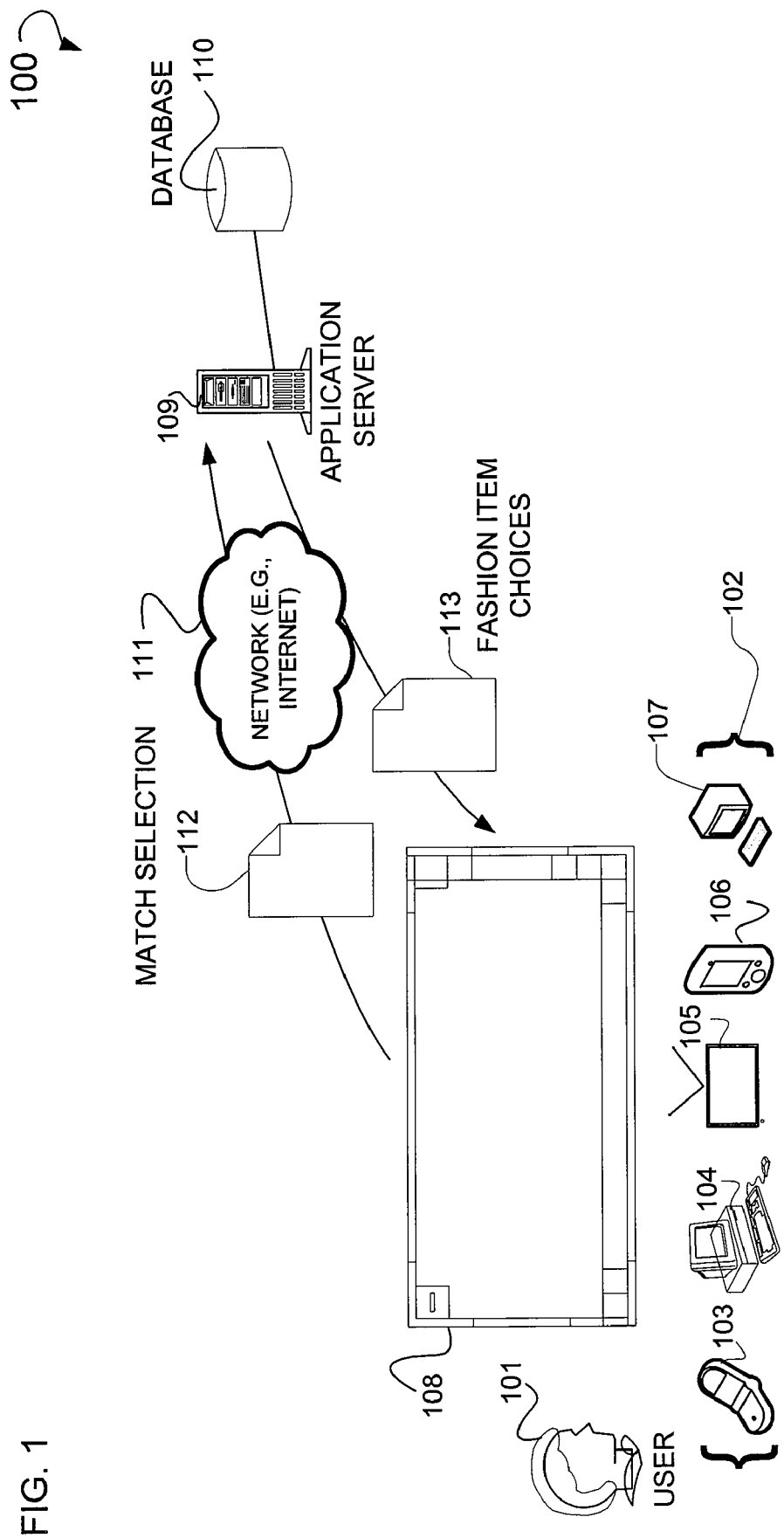
FIG. 1 is a diagram of system, according to an example embodiment, used to generate fashion item choices as a part of a fashion game.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method is shown for fashion matching that interprets a user's style or fashion and finds a match given a set of fashion items. A fashion is a style of dress, while a fashion item includes an article of clothing, jewelry, or anything that is used to denote a style of dress. A user includes a customer of a business that transacts in fashion items. Further, a user may include an expert such as a fashion professional, where this fashion professional includes a fashion designer, a personal shopper, a personal stylist, a journalist who reports on fashion, or some other suitable person. Matching is based, in part, upon an attribute of a fashion item. Attributes include color, fabric, cut, designer, size, time of creation, and other suitable attributes used in denoting a fashion.

In one example embodiment, matching includes receiving input in the form of a particular fashion item, and based upon this fashion item suggesting an additional fashion item based upon matching attributes. Matching is facilitated through the use of a matching algorithm. In one example embodiment, a learning algorithm, such as a neural network is used by the system and method to determine a match in the form of a related association, or to build a related association. Further, a filter or plurality of filters may be used in the conjunction with this neural network. In certain example cases, the filter is applied to the attributes to select only certain attributes that result from the various computation performed by the neural network.

In one example embodiment, matrices are implemented by nodes in a neural network to determine a match. In one example embodiment, one or more attribute association matrices are generated from training data supplied by a user. This training data may be supplied during the course of the user playing a fashion game, whereby the user matches fashion items so as to create a fashion outfit. A fashion outfit is a collection fashion items. A brand association matrix is an example of an attribute association matrix. These one or more attribute association matrices may be generated by an input node residing at the input layer of a neural network. From the attribute association matrices, a set of style matrices is created. The matrices within this set of style matrices may be built through combining attribute association matrices based upon one or more threshold functions. The set of style matrices may be generated by a computational node residing at the computational layer of the neural network. A style matrix is a matrix of fashion item attributes. Further, from the set of style matrices a match is determined by taking an outfit match request and finding the style matrix or matrices that most closely match the fashion items described within the outfit match request. This match may be in the form of an outfit match set. An outfit match set may be generated by an output node residing at the output layer of the neural network. As alluded to above, filters may be applied to each of the layers and nodes included therein. In some example embodiments, a digital closet or a universal closet is organized into a closet association matrix. This closet association matrix may be supply fashion items to be matched using the style association matrix.

Example System

FIG. 1 is a diagram of example system 100 used to generate fashion item choices as a part of a fashion game. Shown is a user 101 utilizing a Graphical Use Interface (GUI) 108 to generate a match selection 112. This GUI 108 may be generated by one or more devices 102. These one or more devices 102 include, for example, a cell phone 103, a computer system 104, a television or monitor 105, a Personal Digital Assistant (PDA) 106, a kiosk 107, or a smart phone (not shown). This match selection 112 is transmitted across a network 111 to be received by an application server 109. Operatively connected to this application server 109 is a database 110. The term operatively connected includes, for example, a logical or physical connection. Database 110 may be a persistent or non-persistent data store that may be natively or non-natively located on the application server 109. The application server 109 transmits the fashion items choices 113 back across the network 111 to be received by the one or more devices 102. The fashion item choices 113 are displayed within GUI 108 for viewing by the user 101. In some example embodiments, the kiosk 107 is a computer system that is placed within a department store or other retail outlet that sells fashion items.

Figure 2:
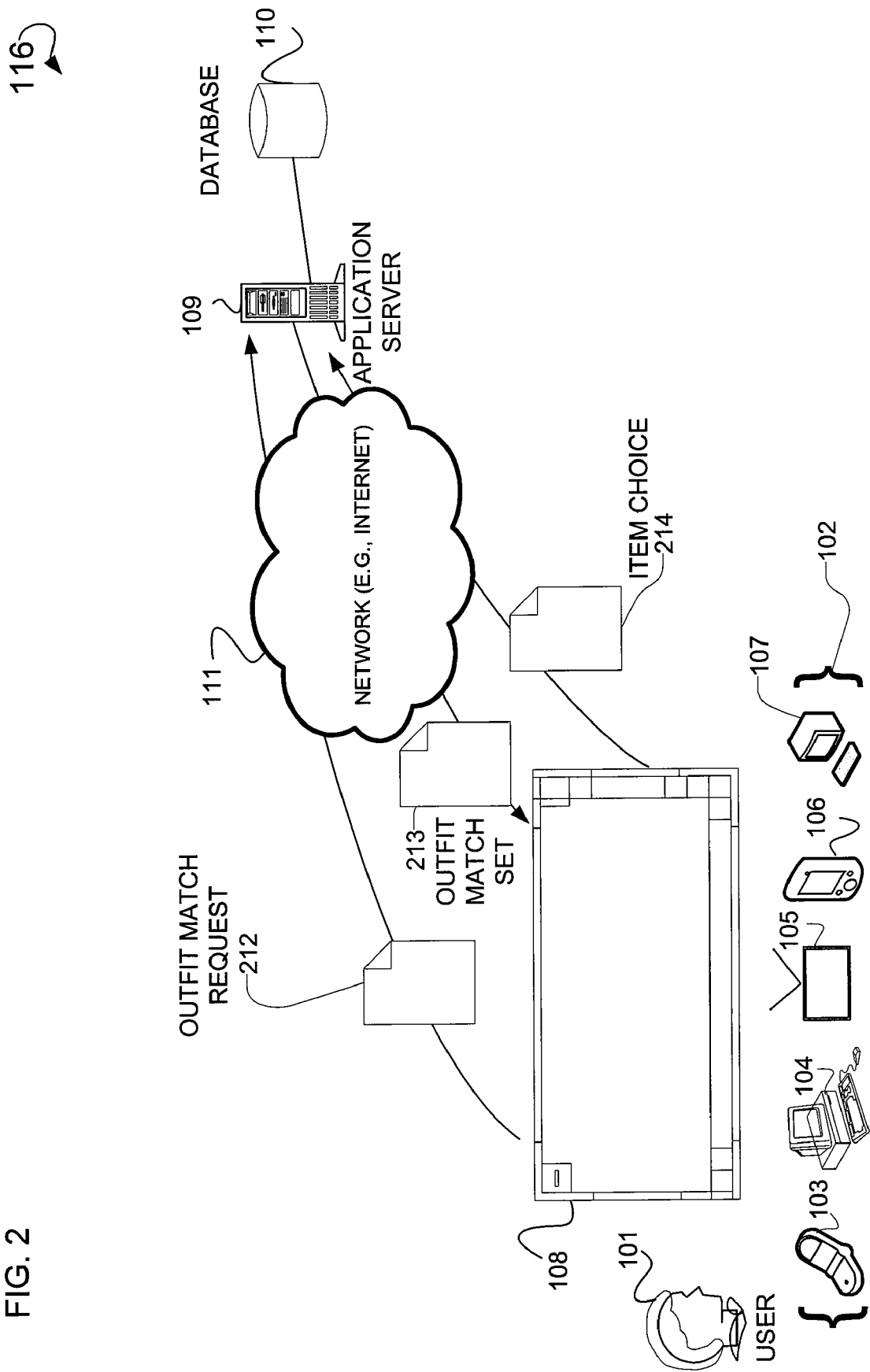
FIG. 2 is a diagram of a system, according to an example embodiment, that is used to generate an outfit match set.

FIG. 2 is a diagram of an example system 200 that is used to generate an outfit matched set. Shown as the user 101 who utilizing the GUI 108 generates an outfit matched request 212. The outfit matched request 212 is transmitted across the network 111 and received by the application server 109. The application server 109 transmits an outfit matched set 213. This outfit matched set 213 is generated based upon the fashion item included within the outfit matched request 212. The user 101 utilizing the GUI 108 may review the outfit matched set 213. Further, the user 101, utilizing the GUI 108, may generate an item choice 214 to be transmitted across the network 111 and to be received by the application server 109. The item choice 214 may be generated using an input device to manipulate a graphical pointer to select an item displayed within the GUI 108. The input device may be a mouse, keyboard, light pen, touch screen, or other suitable input device. The item displayed in the GUI 108 may be a screen object or widget. This item choice 214 may include fashion items selected by the user 101 for purchase or fashion items selected by the user 101 to be associated with other fashion items to create an outfit. Selection may be facilitated through the use of a mouse-over function, a left-click function, a right-click function or other suitable function. Further, selection may be facilitated through a user's physical interaction with a touch screen (e.g., touching a touch screen).

Example Logic

Figure 3:
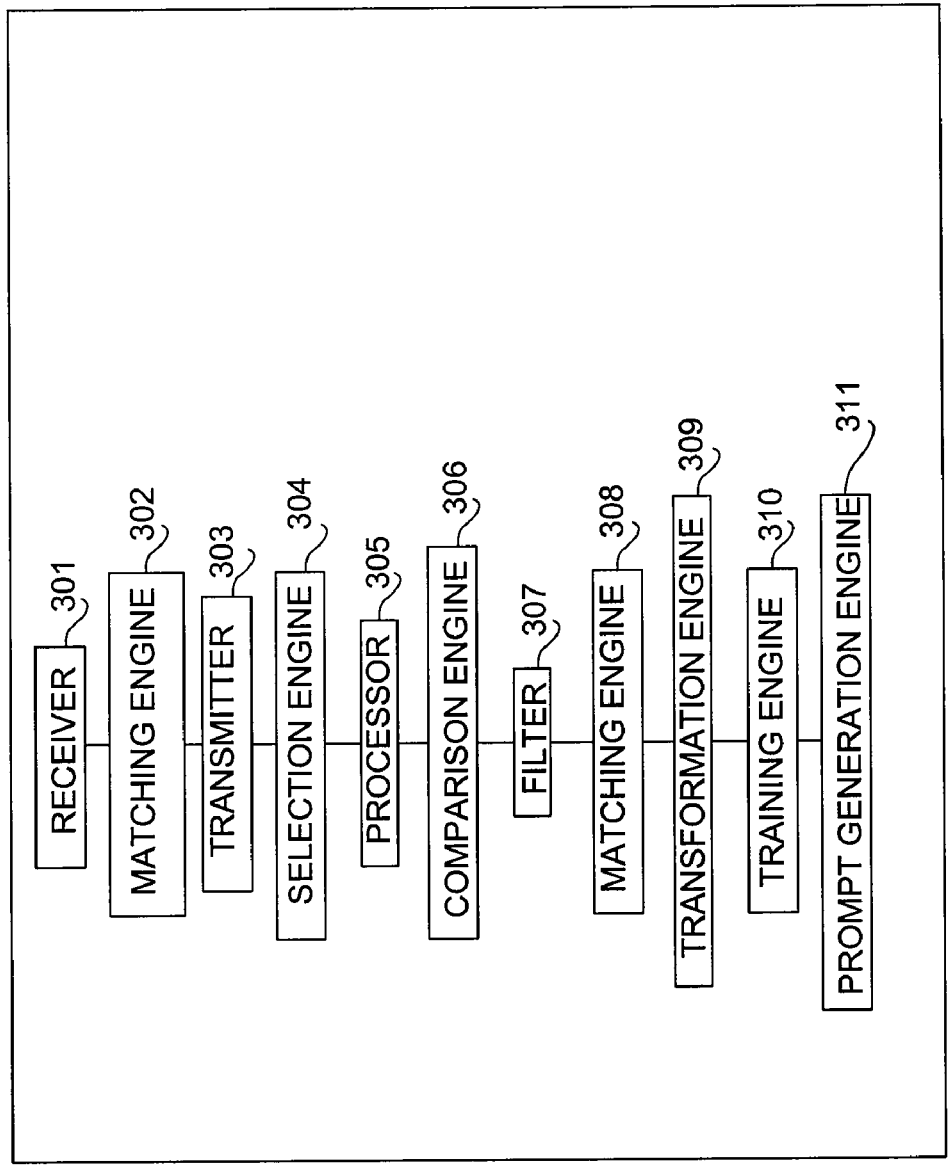
FIG. 3 is a block diagram of a computer system, according to an example embodiment, used to generate an outfit match set.

FIG. 3 is a block diagram of an example computer system 300 used to generate an outfit match set. The blocks shown herein may be implemented in software, firmware, or hardware. These blocks may be directly or indirectly communicatively coupled via a physical or logical connection. The computer system 300 may be the application server 109. Illustrated is a receiver 301 to receive an item choice including a fashion item. Communicatively coupled to the receiver 301 is a matching engine 302 to execute an algorithm to match the fashion item with an additional fashion item selected from a style matrix, the matching based upon an attribute. Communicatively coupled to the matching engine 302 is a transmitter 303 to transmit the additional fashion item as part of an outfit match set. Communicatively coupled to the transmitter 303 is a selection engine 304 to select the fashion item from a digital closet. Communicatively coupled to the selection engine 304 is a processor 305 to process the fashion item to build an attribute association matrix. Communicatively coupled to the processor 305 is a comparison engine 306 to compare the attribute association matrix and the style matrix to determine a match of the fashion item and the additional item. In some example embodiments, the style matrix is generated from an attribute association matrix that includes the fashion item. In some example embodiments, the style matrix is generated through a threshold function that finds a difference between a first attribute association matrix and a second attribute association matrix, where this difference is less than or equal to a threshold value. In some example embodiments, the first and second attribute association matrices are included in an input layer of a neural network, and the style matrix is included in a computational layer of the neural network.

In some example embodiments, the computer system 300 also includes a filter 307 communicatively coupled to the comparison engine 306, the filter 307 to filter the fashion item and the additional fashion item using a filter that includes at least one of a color-to-color association filter, a price-to-price association filter, or a fabric-to-fabric association filter. The filter 307 may be used to filter attributes of fashion items. Filter 307 may also include a filter to filter the fashion item and the additional fashion item based upon a fashion item attribute. In some example embodiments, the filter is a weighted link in a neural network (see FIG. 5 below). Communicatively coupled to the filter 307 is an additional matching engine 308 to match the fashion item and the additional fashion item through comparing an image of the fashion item and an additional image of the additional fashion item. Communicatively coupled to the additional matching engine 308 is a transformation engine 309 to transform the images into a same position as an association of the images. Communicatively coupled to the transformation engine 309 is a training engine 310 to train a neural network to recognize the association of the images. Communicatively coupled to the training engine 310 is a prompt generation engine 311 to generate a prompt to purchase the additional fashion item. In some example embodiments, the computer system 300 is communicatively coupled to another computer system including at least one of a computer system, a cell phone, Personal Digital Assistant (PDA), or a kiosk.

Figure 4:
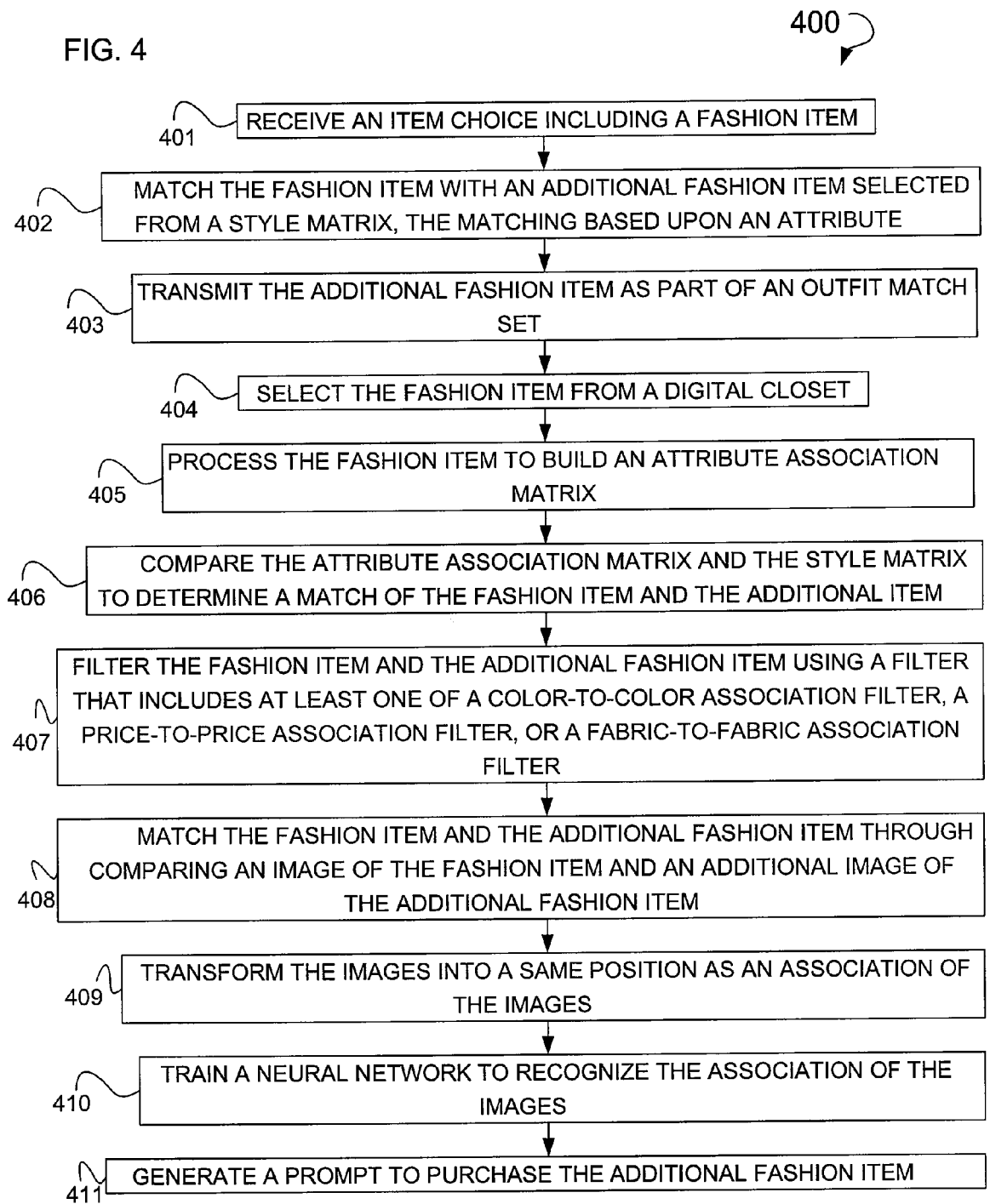
FIG. 4 is a flow chart illustrating a method, according to an example embodiment, used to generate an outfit match set.

FIG. 4 is a flow chart illustrating an example method to generate an outfit match set. The various operations illustrated herein may be implemented on the application server 109. Operation 401 is executed to receive an item choice including a fashion item. Operation 402 is executed to match the fashion item with an additional fashion item selected from a style matrix, the matching based upon an attribute. Operation 403 is executed to transmit the additional fashion item as part of an outfit match set. Operation 404 is executed to select the fashion item from a digital closet. A digital closet includes a computer file written as a character delimited flat file, a database table, or eXtensible Markup Language (XML) file to store data relating to fashion items owned by a user. In some example embodiments, the digital closet is stored as part of the database 110. In example some embodiments, the digital closet is stored onto the device 102. Additionally, this digital closet may be organized as a closet association matrix. Operation 405 is executed to process the fashion item to build an attribute association matrix. Operation 406 is executed to compare the attribute association matrix and the style matrix to determine a match of the fashion item and the additional item. In some example embodiments, the style matrix is generated from an attribute association matrix that includes the fashion item. In some example embodiments, the style matrix is generated through a threshold function that finds a difference between a first attribute association matrix and a second attribute association matrix, where this difference is less than or equal to a threshold value. Further, in some example embodiments, the first and second attribute association matrices are included in an input layer of a neural network, and the style matrix is included in a computational layer of the neural network. Operation 407 is executed to filter the fashion item and the additional fashion item using a filter that includes at least one of a color-to-color association filter, a price-to-price association filter, or a fabric-to-fabric association filter. In some example embodiments, the filtering is conducted through a weighted link in a neural network. Operation 408 is executed to match the fashion item and the additional fashion item through comparing an image of the fashion item and an additional image of the additional fashion item. Operation 409 is executed to transform the images into a same position as an association of the images. Operation 410 is executed to train a neural network to recognize the association of the images. Operation 411 is executed to generate a prompt to purchase the additional fashion item.

Figure 5:
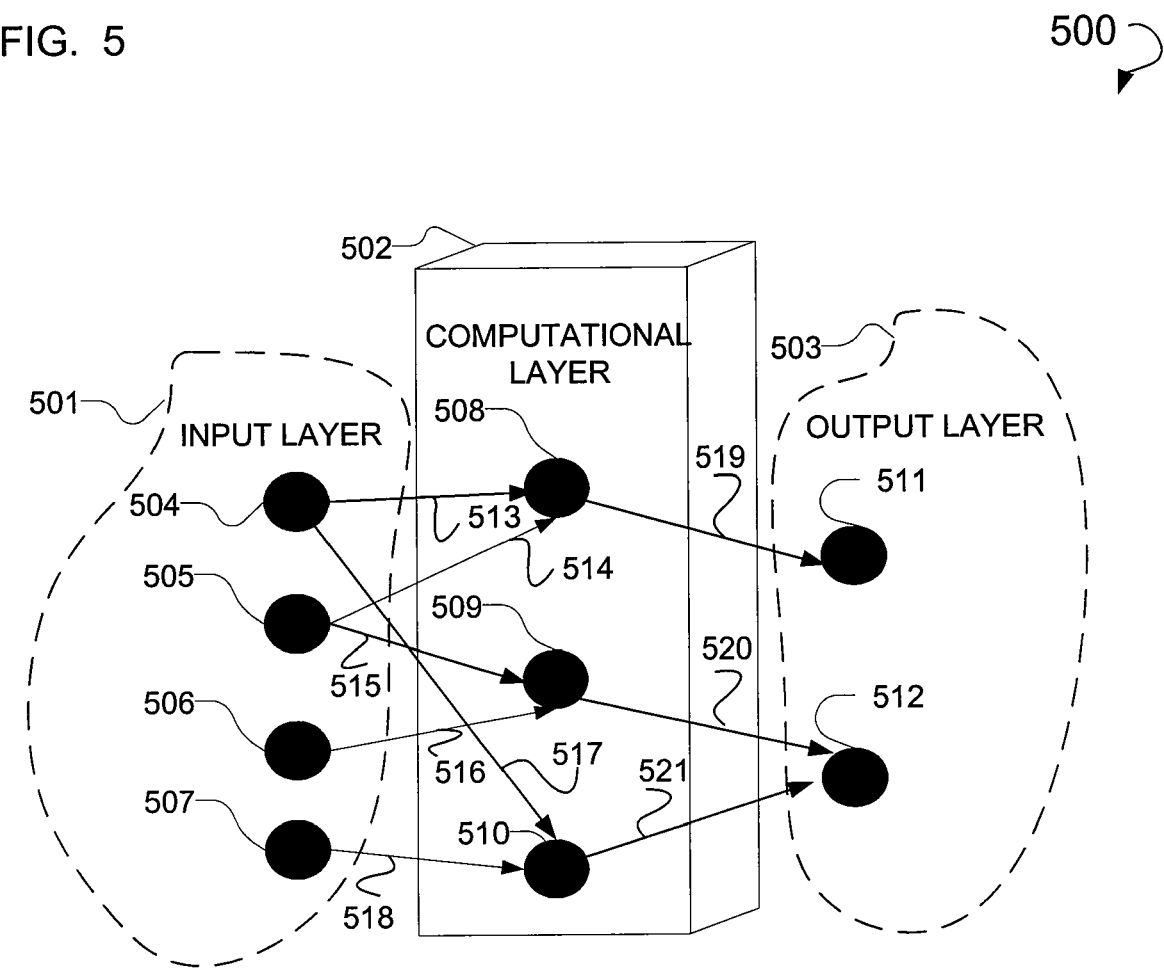
FIG. 5 is a diagram of a neural network, according to an example embodiment, used to find a match given a set of fashion items.

FIG. 5 is a diagram of an example neural network 500 used to find a match given a set of fashion items. Shown is a multilayer feed-forward neural network including an input layer 501, a computational layer 502, and an output layer 503. Included in the input layer 501 are a node 504, node 505, node 506, and node 507. In some example embodiments, each of these nodes 504 through 507 correspond to training data in the form of an attribute of a fashion item. Further, a stochastic gradient method may be applied to the training data to randomly select the training data for transmission to the computational layer 502. In some example cases, the training data is cycled through such that all the training data is utilized by the system and method. Further illustrated is the computational layer 502 that includes nodes 508 through 510. These nodes utilize a threshold function to build the set of style matrices. The output layer 503 includes nodes 511 and 512 that are used to generate an outfit match set. Connecting the nodes of the various layers is a plurality of links. These links may be weighted so as to filter the data transmitted between each of the layers. For example, node 504 is connected to node 508 and node 510 by link 513 and link 517 respectively. Node 505 is connected to nodes 508 and 509 by links 514 and 515. Node 506 is connected to node 509 by link 516. Node 507 is connected to node 510 via link 518. Additionally, node 508 is connected to node 511 via link 519. Moreover, node 509 is connected to node 512 via link 520. Link 521 is used to connect nodes 510 and 512.

While a multilayer feed-forward neural network is depicted in FIG. 5, the system and method shown herein may be implemented using a single-layer feed-forward neural network (e.g., a perceptron based network). Further, this neural network 500 may also be implemented using a recurrent network, wherein user fashion selections are used as training data (see e.g., match selections 112) in lieu of the feed-forward approach disclosed herein.

In some example embodiments, the neural network 500 may be replaced by or used in conjunction with some other suitable Artificial Intelligence (A.I.) algorithm including: case-based reasoning, Bayesian networks (including hidden Markov models), or fuzzy systems. The Bayesian networks may include: machine learning algorithms including—supervised learning, unsupervised learning, semi-supervised learning, reinforcement learning, transduction, learning to learn algorithms, or some other suitable Bayesian network. The neural networks may include: Kohonen self-organizing network, recurrent networks, simple recurrent networks, Hopfield networks, stochastic neural networks, Boltzmann machines, modular neural networks, committee of machines, Associative Neural Network (ASNN), holographic associative memory, instantaneously trained networks, spiking neural networks, dynamic neural networks, cascading neural networks, neuro-fuzzy networks, or some other suitable neural network. Further, the neural networks may include: machine learning algorithms including—supervised learning, unsupervised learning, semi-supervised learning, reinforcement learning, transduction, learning to learn algorithms, or some other suitable learning algorithm.

In some example embodiments, any number of stochastic A.I. algorithms may be implemented including: genetic algorithms, ant algorithms, tabu search algorithms, or Monte Carlo algorithms (e.g., simulated annealing). Common to these algorithms is the use of randomness (e.g., randomly generated numbers) to avoid the problem of being unduly wedded to a local minima or maxima.

Figure 6:
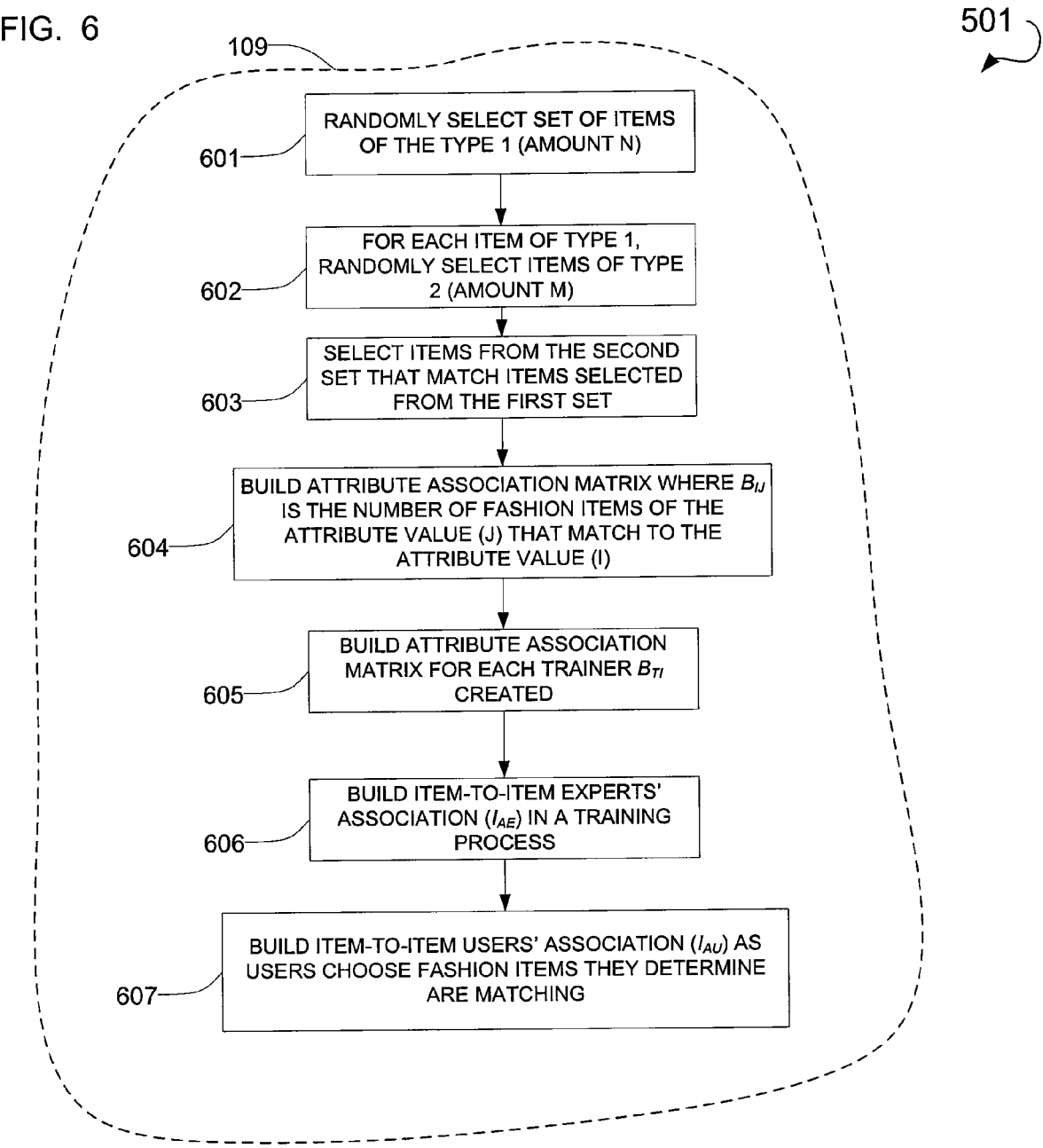
FIG. 6 is a flow chart illustrating a method, according to an example embodiment, used to implement an input layer of a neural network.

FIG. 6 is a flow chart illustrating an example method used to implement the input layer 501. The various operations outlined as part of this method may be implemented by the application server 109. These various operations are used to build attribute association matrices. An attribute association is a numerical correlation of matching fashion items of with attribute (i) to fashion items with attribute (j) for a pair of fashion items type. Operation 601 is executed to randomly select a set of the items of the type 1 (amount n). Operation 602 is executed for each item of type 1 to randomly select items of type 2 (amount m). Operation 603 is executed to select items from the second set that match items selected from the first set. Operation 604 is executed to build an attribute association matrix of the form:

$$B_a = \begin{pmatrix} b_{11} & b_{12} & b_{1j} & b_{1m} \\ b_{i1} & b_{i2} & b_{ij} & b_{im} \\ \bullet & \bullet & \bullet & \bullet \\ b_{n1} & b_{n2} & & b_{nm} \end{pmatrix}$$

As illustrated above, $b_{ij}$ is a number of the fashion items of the brand (j) that matches to the brand (i). Further, included as part of this attribute association matrix is the normalization of the matrix through dividing the ((b)) coefficients of each row by the sum of the coefficients of this row. Operation 605 is executed to build an attribute association matrix for each trainer $B_{ti}$. Operation 606 is executed to build an item-to-item experts' association ($I_{ae}$) in a training process. An operation 607 is executed to build item-to-item users' association ($I_{au}$) based upon a user's fashion item choices. These choices reflect fashion items that are determined by the user to form a match. This determination is commonly made during the course of creating an outfit.

Figure 7:
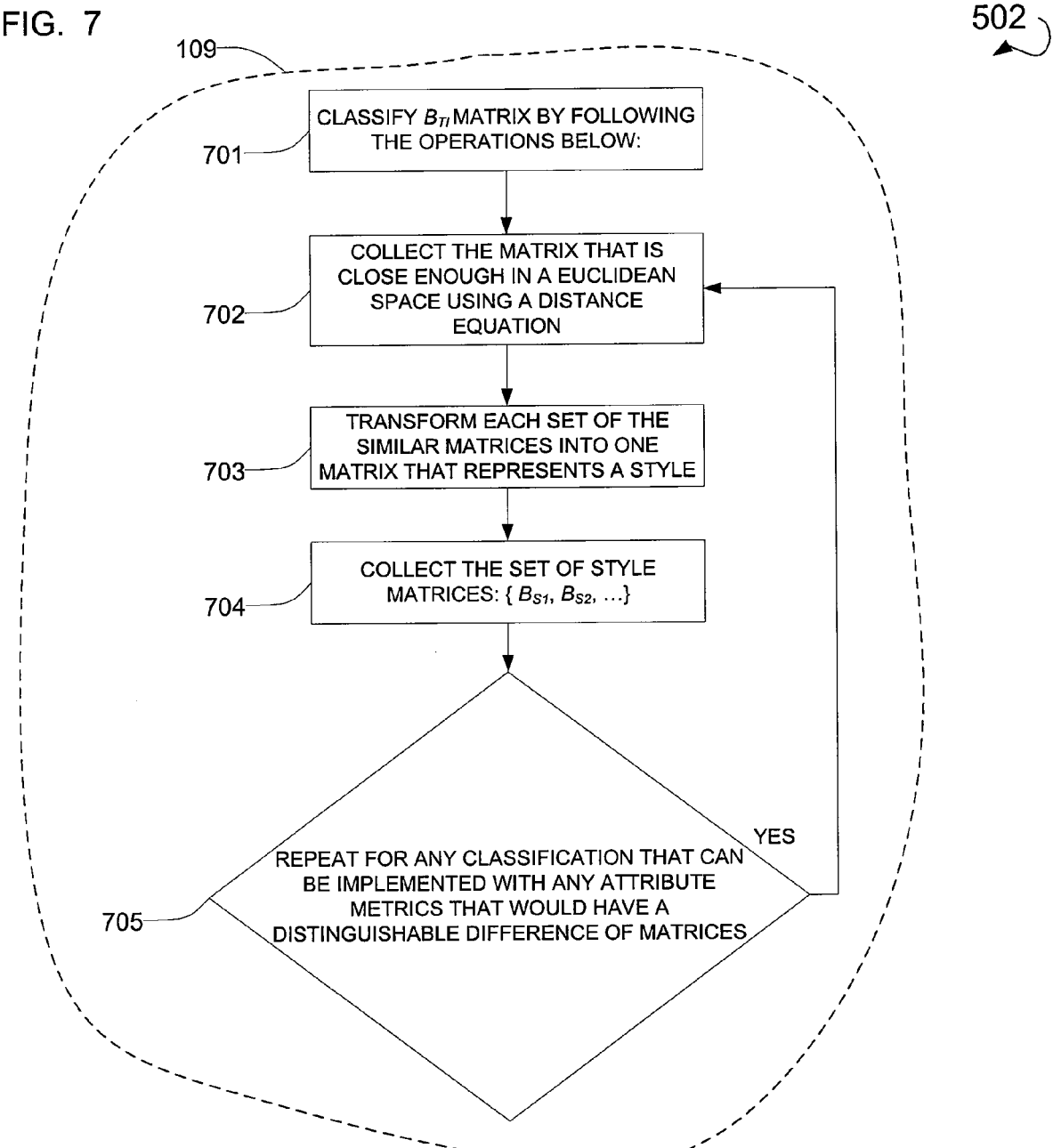
FIG. 7 is a flow chart illustrating a method, according to an example embodiment, used to implement a computational layer of a neural network.

FIG. 7 is a flow chart illustrating an example method to implement the computational layer 502. The various operations outlined herein may be implemented by the application server 109. Shown is an operation 701 that, when executed, classifies $B_{ti}$ matrix through the execution of operations 702 through 704. Operation 702 is executed to collect the matrix that is close enough in an Euclidean space. This collection process may utilize a threshold function having the form:

$$\|B_{ij} - B_{tl}\| <= \epsilon$$

As illustrated above, $\epsilon$ is a threshold value predetermined by those implementing the system and method as the basis upon which a match is found. Operation 703 is executed to transform each set of the similar matrices into one matrix that represents a style. Operation 704 is executed to collecting the set of style matrices: $\{B_{s1}, B_{s2} \ldots \}$. A decisional operation 705 is shown that determines whether the classification that can be implemented with any attribute metrics that would have a distinguishable difference of matrixes. In cases where decisional operation 705 evaluates to "yes," operation 702 is re-executed. Otherwise decisional operation 705 evaluates to "no" and the operation terminates (not shown).

Figure 8:
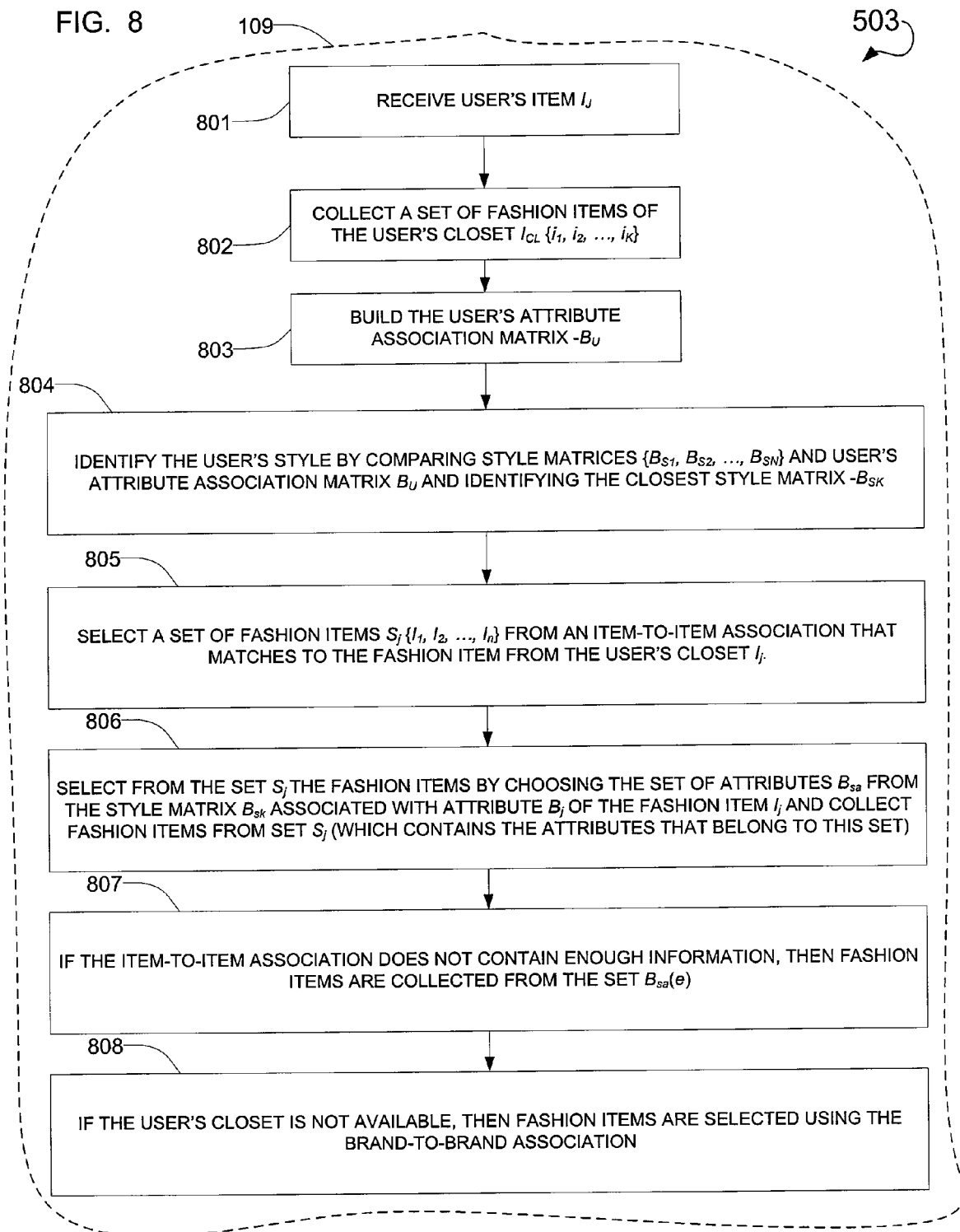
FIG. 8 is a flow chart illustrating a method, according to an example embodiment, used to implement an output layer of a neural network.

FIG. 8 is a flow chart illustrating an example method used to implement the output layer 503. The various operations outlined below (e.g., 801-905), may be executed by the application server 109. Shown is an operation 801 that, when executed, receives user 101's item $I_j$. This item is provided as part of the outfit match request 212. Operation 802 is executed to collect a set of fashion items of the user's closet $I_{cl}$ $\{i_1, i_2, \ldots, i_k\}$. Operation 803 is executed to build the user's attribute association matrix $-B_u$. Operation 804 is executed to identify the user's style by comparing style matrices $\{B_{s1}, B_{s1}, \ldots, B_{sn}\}$ and user's attribute association matrix $B_u$, and identifying the closest style matrix $-B_{sk}$. Operation 805 is executed to select a set of fashion items $S_j\{I_1, I_2, \ldots, I_n\}$ from an item-to-item association that matches to the fashion item from the user's closet $I_j$. Operation 806 is executed to select from the set $S_j$ the fashion items by choosing the set of attributes $B_{sa}$ from the style matrix $B_{sk}$ associated with attribute $B_j$ of the fashion item $I_j$ and collecting fashion items from set $S_j$ (e.g., which includes the attributes that belong to this set). Operation 807 is executed to determine if the item-to-item association does not contain enough information, then fashion items are collected from the set $B_{sa}$ (e). Operation 808 is executed to determine if the user's closet set (e.g., the user's digital closet) is not available, then fashion items are selected using the brand-to-brand association. These operations 807 and 808 may be illustrated as a decisional operation in some example embodiments.

In some example embodiments, where a user's digital closet is not available a universal closet may be utilized. A universal closet is data store that includes fashion items aggregated from one or more sources that may include fashion items not owned by the user. In some example embodiments, the universal closet may be supplemented by fashion items owned by the user. These sources include one or more retail-store catalogues, designer catalogues, or other suitable sources. In some example embodiments, the devices 102, or computer systems 300, accesses a source, and uses this source in lieu of user 101's item $I_j$. The above illustrated brand-to-brand association may be applied to the universal closet.

Figure 9:
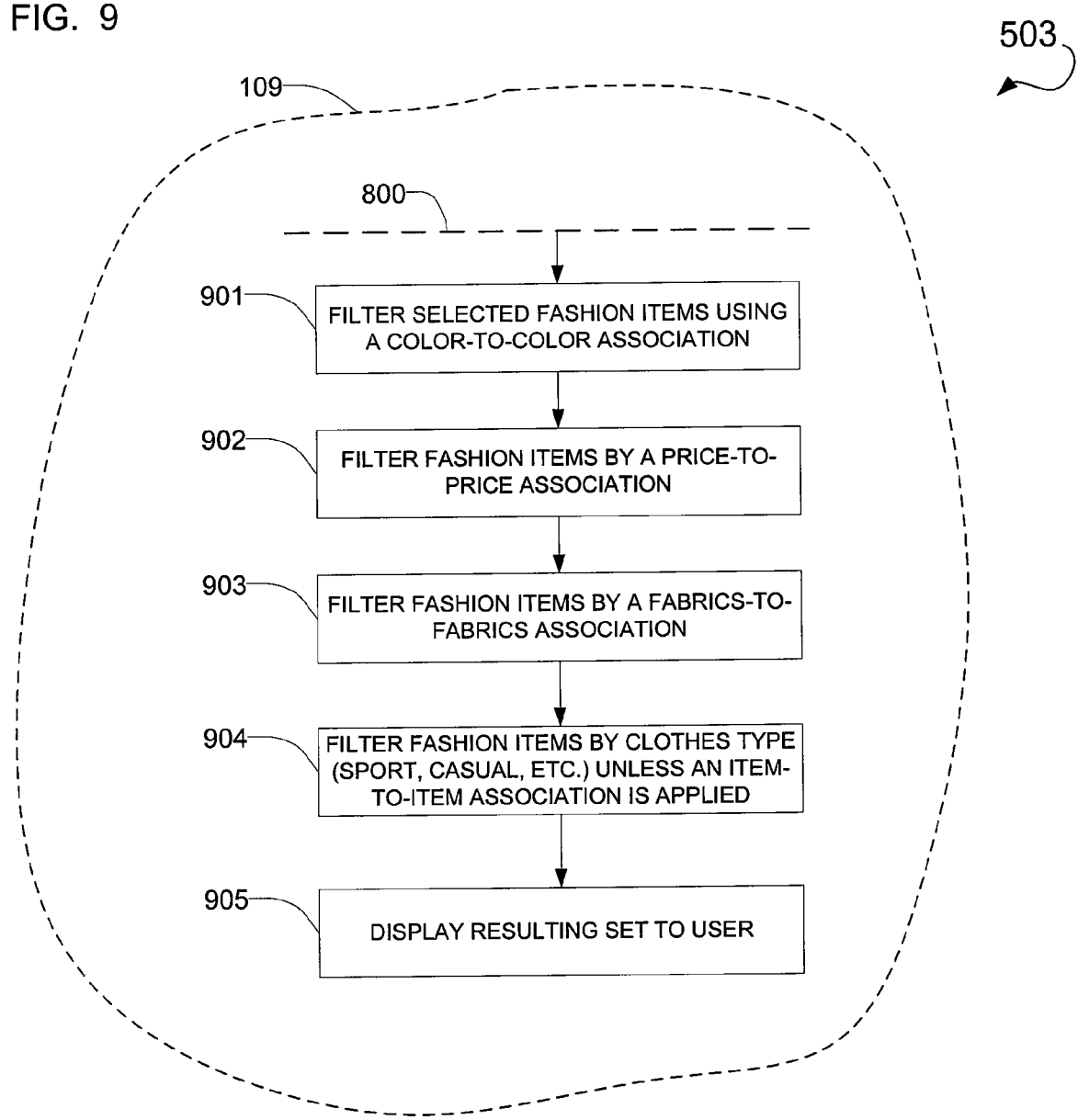
FIG. 9 is a flow chart illustrating a continuing method, according to an example embodiment, used to implement an output layer of a neural network.

FIG. 9 is a flow chart illustrating a continuation of an example method used to implement the output layer 503. This FIG. 9 includes operations additionally included in FIG. 8. Shown is an operation 901 that, when executed, filters selected fashion items using a color-to-color association. Operation 902 is executed to filter fashion items by a price-to-price association. Operation 903 is executed to filter fashion items by a fabrics-to-fabrics association. Operation 904 is executed to filter fashion items by clothes type (e.g., sport, casual, etc) unless an item-to-item association is applied. Operation 905 is executed to display a resulting set to the user 101. This filtering as shown in operations 901 through 905 may be implemented through weighting the links referred to above that link each of the layers (e.g., links 513 through 518, 519, through 521).

Figure 10:
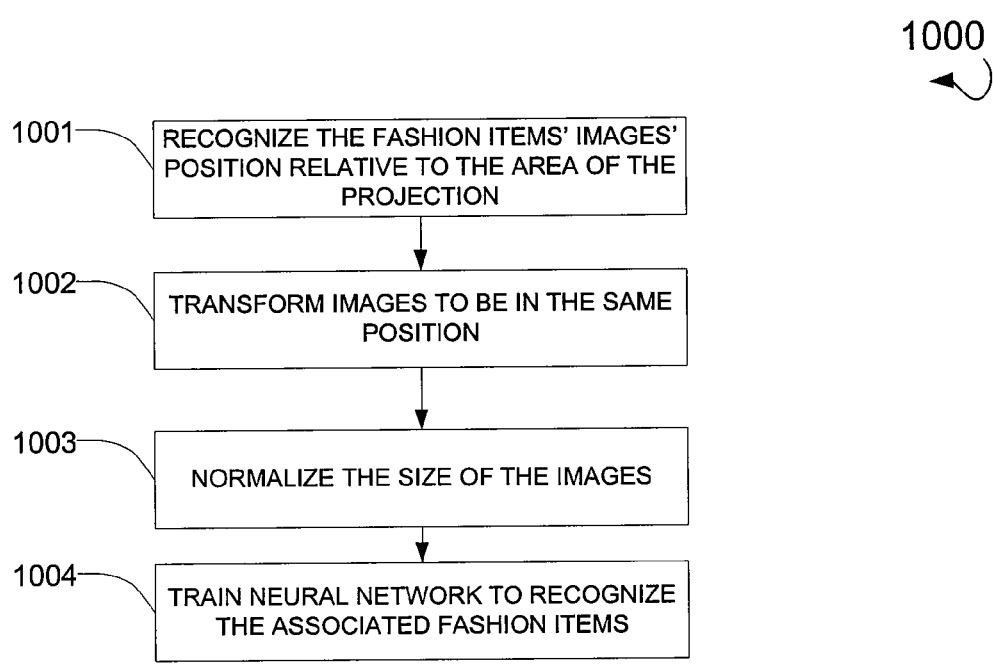
FIG. 10 is a flow chart illustrating a method, according to an example embodiment, used to finding matches by training a neural network to find fashion items associated by their shapes.

FIG. 10 is a flow chart illustrating an example method 1000 used to finding matches by training the neural network 500 to find fashion items associated by their shapes. Shape may be a fashion attribute. Method 1000 may be implemented by the application server 109. Shown is an operation 1001 that, when executed, recognizes the fashion items' images' position relative to the area of the projection. Operation 1002 is executed to transform images to be in the same position. Operation 1003 is executed to normalizing the size of images. Operation 1004 is executed to train the neural network 500 to recognize the associated fashion items.

Figure 11:
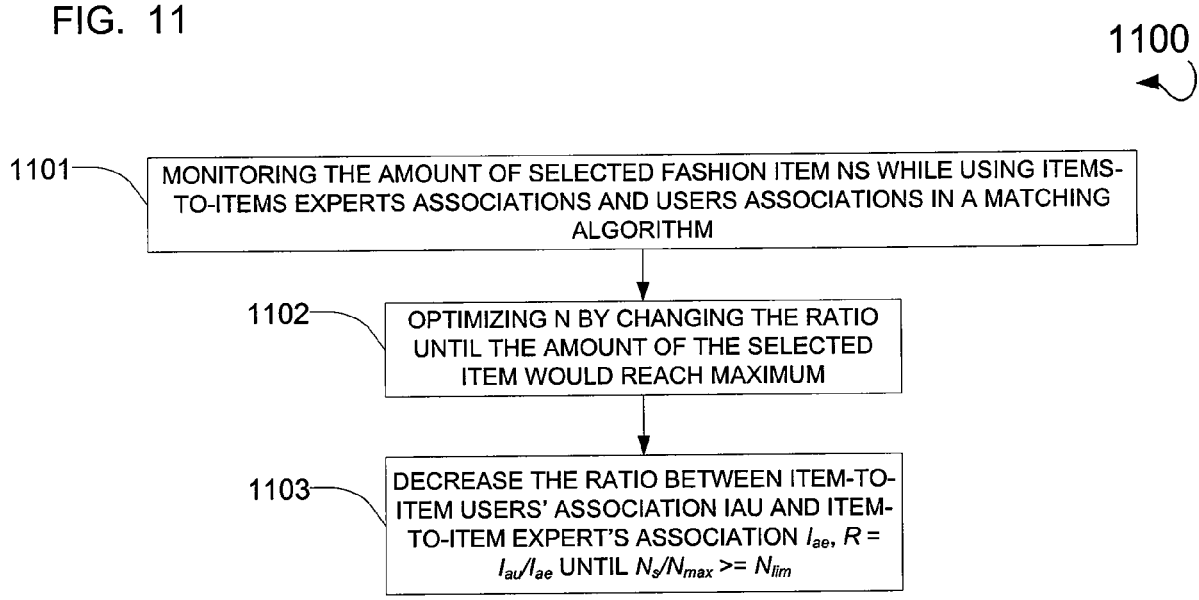
FIG. 11 is a flow chart illustrating a method, according to an example embodiment, used to direct users' selections into an optimal sale trajectory.

FIG. 11 is a flow chart illustrating an example method 1100 used to divert a users' selection into an optimal sale trajectory. Method 1100 may be implemented by the application server 109. Operation 1101 is executed to monitor the amount of selected fashion item $N_s$ while using items-to-item experts associations and users' associations in a matching algorithm. Operation 1102 is executed to optimizing N by changing the ratio until the amount of the selected item reach maximum. Operation 1103 is executed to decreasing the ratio between item-to-item users' association $I_{au}$ and item-to-item expert's association $I_{ae}$ where:

$$R = I_{au}/I_{ae} \text{ until } N_s/N_{max} >= N_{lim}$$

Figure 12:
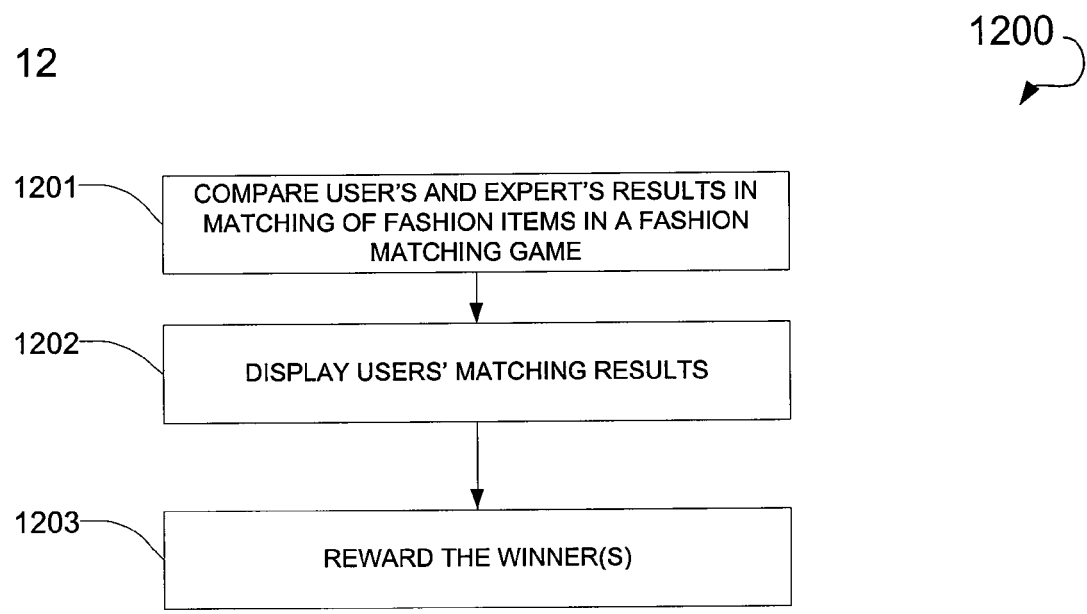
FIG. 12 is a flow chart illustrating a method, according to an example embodiment, used to train and promoting users to follow optimal matching.

FIG. 12 is a flow chart illustrating an example method 1200 used to train and promoting users to follow optimal matching (e.g., an optimal sale trajectory). Method 1100 may be implemented by the application server 109. Operation 1201 is executed to compare a user's and the experts' results in matching of fashion items as part of a fashion matching game. Operation 1202 is executed to displaying users' matching results. Operation 1203 is executed to rewarding the winner(s). A reward may include some type of monetary remuneration.

Figure 13:
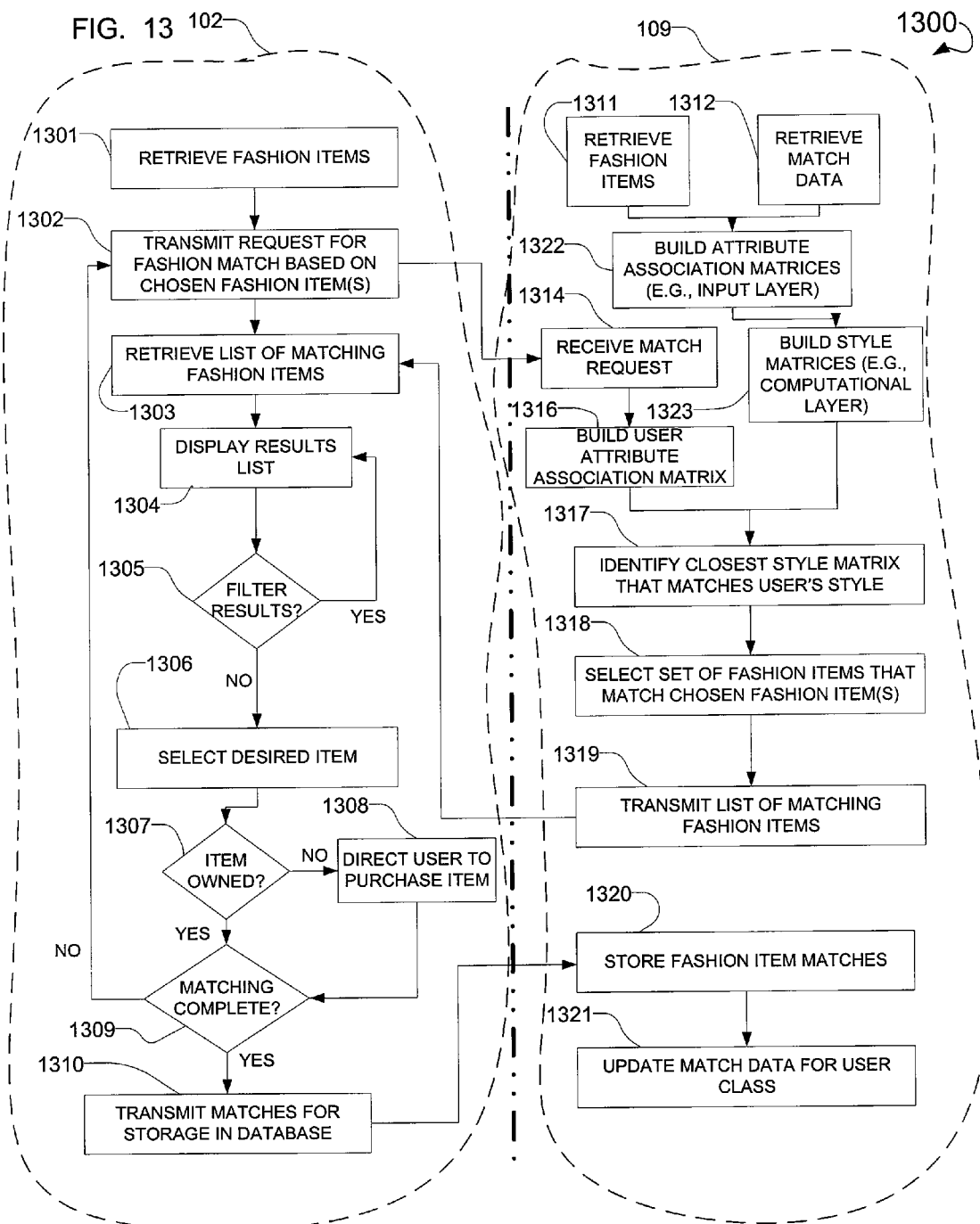
FIG. 13 is a dual-stream flowchart illustrating a method, according to an example embodiment, used to generate an outfit matched set.

FIG. 13 is a dual-stream flowchart illustrating the example execution of a method 1300 used to generate an outfit matched set 213. Illustrated are operations 1301 through 1310 that are executed by the one or more devices 102. Further, illustrated are operations 1311, 1312, 1322, 1314, 1313 and operations 1316 through 1321. These various operations are executed by the application server 109. Illustrated is an operation 1311 that, when executed, retrieves fashion items. These fashion items may be retrieved from the database 110. Further, an operation 1312 is executed that retrieves matched data. This match data may additionally be retrieved from the database 110. Operation 1322 is executed that acts as input layer for the neural network 500 (see, e.g., FIG. 5). This operation 1322, when executed, builds attribute association matrices. Further, an operation 1323 is shown that acts as a computational layer for a neural network (see, e.g., FIG. 5). The operation 1323 builds style matrices. Through the execution of operations 1311, 1312, and 1322 and 1323 the neural network is trained to receive the outfit match request 212, and to process this outfit match request 212 to find a match in terms of fashion items.

In some example embodiments, operation 1301 is executed to retrieved fashion items. These fashion items may be retrieved from a digital closet (not pictured), or through input provided by the user 101 via the GUI 108. Operation 1302 is executed to transmit a request for a fashion match based upon chosen fashion items, where these chosen fashion items may be the retrieved fashion items illustrated at operation 1301. Through the execution of operation 1302, the outfit match request 212 is transmitted from the one or more devices 102 to the application server 109. Through the execution of operation 1314 the outfit match request 212 is received. Operation 1314 is executed to receive a match request.

In some example embodiments, operation 1316 is executed to build a user attribute association matrix. The user attributes association matrix includes attributes of fashion items wherein these attributes can be color, size, texture of fabric, fabric or other suitable attributes. Operation 1317 is executed to identify a closest style matrix that matches a user's style. A determination of whether a style matrix matches a user's style is facilitated through the use of the previously illustrated threshold function. Operation 1318 is executed that selects a set of fashion items that matches the chosen fashion item. Operation 1319 is executed that transmits a list of fashion items as, for example, an outfit match set 213. Operation 1303 is executed that retrieves the list of fashion items (e.g., the outfit match set 213). Operation 1304 is executed that displays a results list in the GUI 108. Decisional operation 1305 is executed to determine whether not to filter the results. In cases where decisional operation 1305 evaluates to "yes," the operation 1304 is re-executed. In cases where decisional operation 1305 evaluates to "no" an operation 1306 is executed. Operation 1306, when executed, selects a desired item. Specifically, the operation 1306, when executed, receives input selecting a desired item. This input may be generated via an input device. Further, the decisional operation 1305 is executed, in some example embodiments, on the application server 109 in lieu of being executed on the one or more devices 102. Decisional operation 1307 is executed to determine whether or not an item is owned by the user 101. The items owned by the user 101 are found in the digital closet or universal closet. In cases where decisional operation 1307 evaluates to "no" an operation 1308 is executed. Operation 1308 is executed to prompt the user 101 to purchase an item. This prompt may be transmitted by the application server 109. In cases where decisional operation 1307 evaluates to "yes" a further decisional operation 1309 is executed. Decisional operation 1309 determines whether or not a match is complete, or whether additional matching needs to be performed by the application server 109. In cases where decisional operation 1309 evaluates to "no" the operation 1302 is re-executed. In cases where decisional operation 1309 evaluates to "yes" an operation 1310 is executed that transmits matches for storage into a database. This database may be operatively coupled via a logic or physical connection to the one or more devices 102 (not pictured). Further, in some example embodiments, upon completion of the execution of operation 1310 the operation 1320 is executed that stores fashion item matches into the database 110. Further, an operation 1321 is executed to update match data for a particular user class. A user class may include a lay person class, a fashion expert class, fashion journalist class, or some other suitable class.

Figure 14:
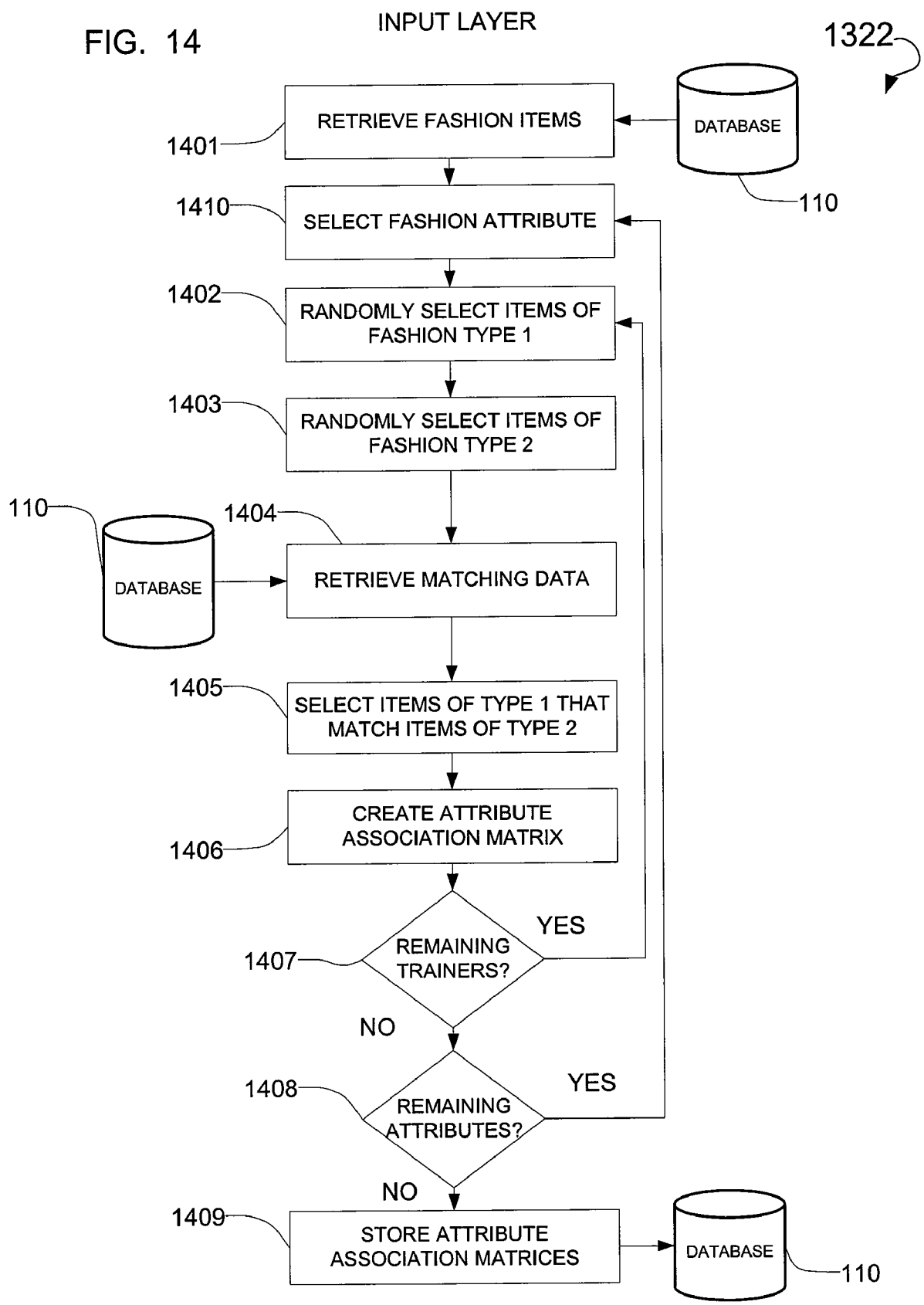
FIG. 14 is a flowchart illustrating the execution of an operation, according to an example embodiment, used to implement an input layer.

FIG. 14 is a flowchart illustrating the example execution of operation 1322. This operation 1322 is akin to the input layer 501 and the functionality associated therewith. Shown is an operation 1401 that retrieves fashion items from the database 110. Further, an operation 1410 is executed to select a fashion attribute. The execution of operation 1410 may be facilitated through the use of one of the previously illustrated input devices. Operation 1402 is executed to randomly select an item of a fashion type 1. This random selection process is facilitated through, for example, a stochastic graded method. An operation 1403 is executed that randomly selects items of fashion type 2, again using the stochastic graded method. Operation 1404 is executed that retrieves matched data from the database 110. Operation 1405 is executed to select items of type 1 that match items of type 2, or a match may be based upon some type of fashion attribute. Operation 1406 is executed that creates an attribute association matrix. Decisional operation 1407 is executed that determines whether or not there is a trainer. An operation 1406 is executed to create an attribute association matrix. Decisional operation 1407 is executed to determine whether or not there are any remaining trainers. In cases where decisional operation 1407 evaluates to "yes," operation 1402 is re-executed. In cases where decisional operation 1407 evaluates to "no," a further decisional operation 1408 is executed. Decisional operation 1408 determines whether or not there are any remaining attributes to be matched. Cases where decisional operation 1408 evaluates to "yes," operation 1410 is re-executed. In cases where decisional operation 1408 evaluates to "no," operation 1409 is executed. Operation 1409 stores the attribute association matrix or matrices into the database 110.

Figure 15:
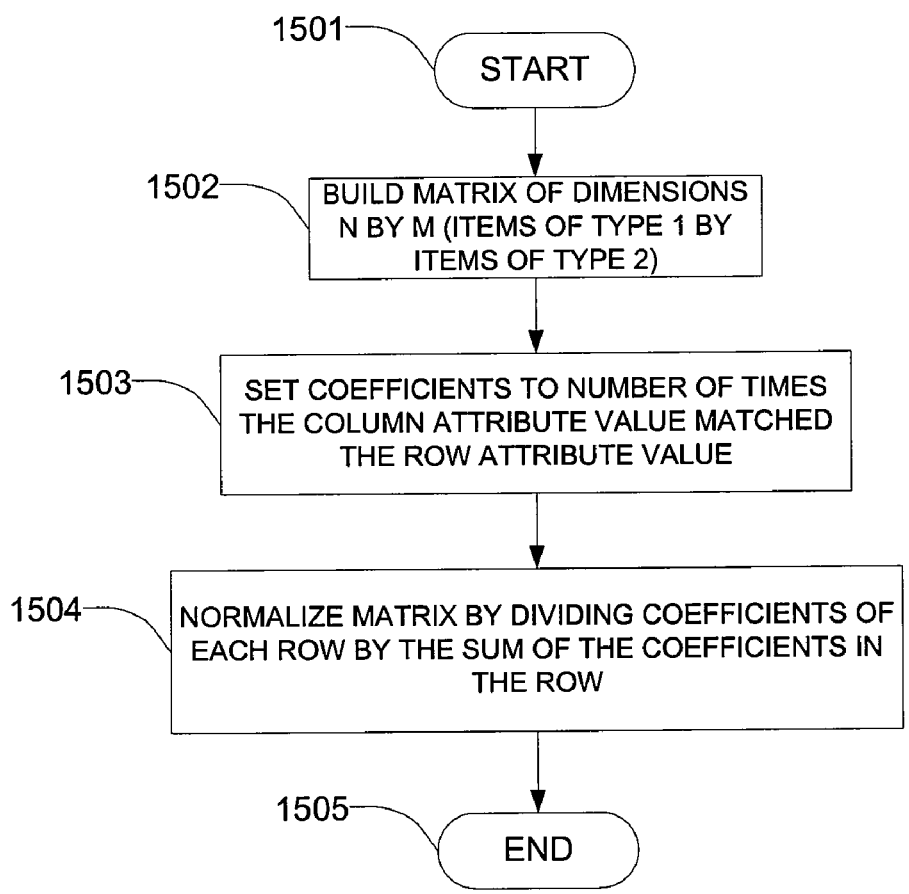
FIG. 15 is a flowchart illustrating the execution of an operation, according to an example embodiment, that creates an attribute association matrix.

FIG. 15 is a flowchart illustrating the example execution of operation 1406 shown is a start operation 1501. In operation 1502 is executed that built a matrix of dimensions N by M (e.g., N×M) where dimensions N by M correspond to previously illustrated items of type 1 and items of type 2. Operation 1503 is executed to accept a coefficient to the number of times the column attribute value is matched to a real attribute value. These column and row attributes values appear within a matrix. Operation 1504 is executed that normalizes the matrix by dividing coefficients in each row by the sum of coefficients in the row. Operation 1505 is executed as a determination operation.

Figure 16:
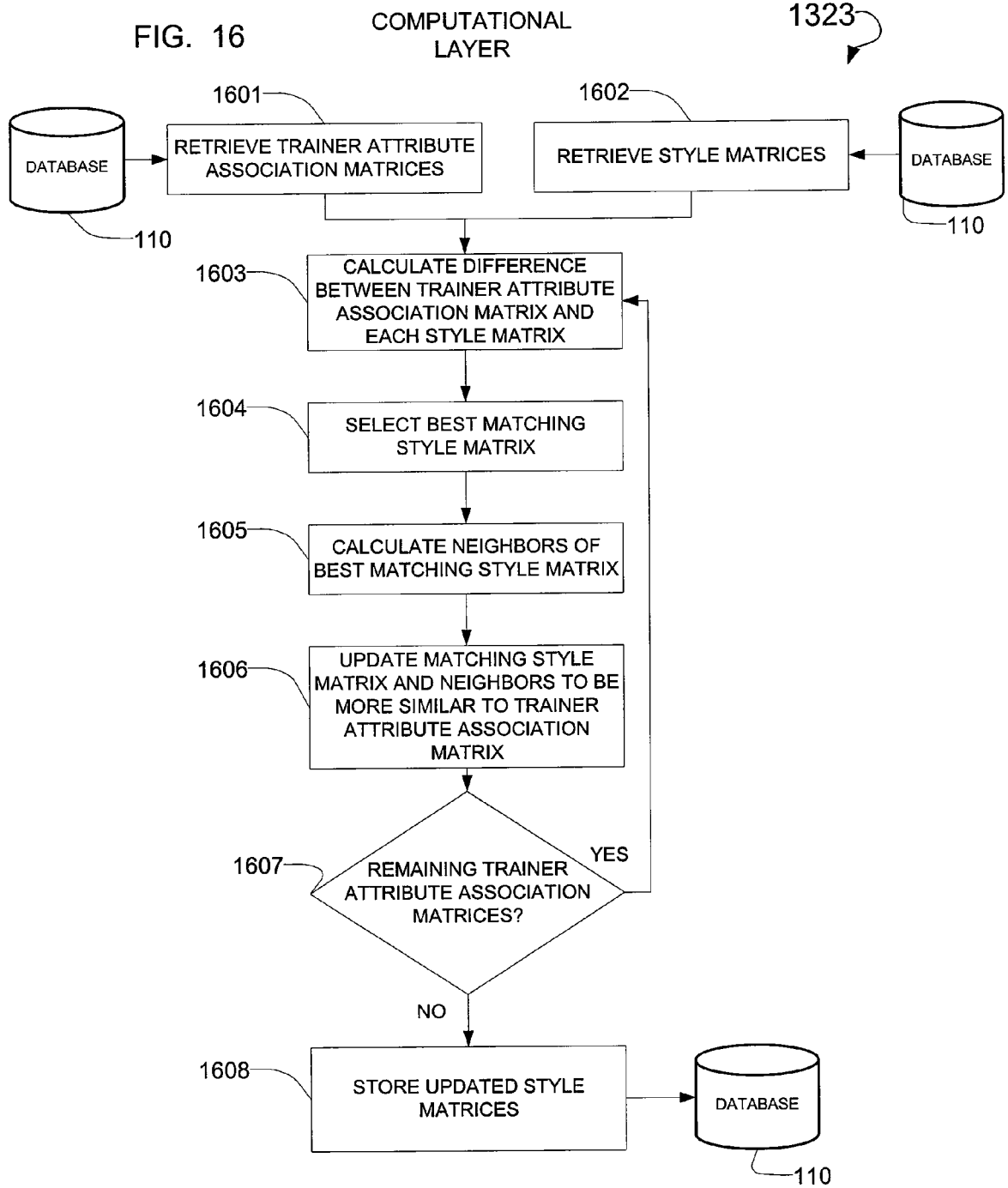
FIG. 16 is a flow chart illustrating the execution of an operation, according to an example embodiment, used to implement a computational layer.

FIG. 16 is a flow chart illustrating the example execution of operation 1323. This operation 1323 is akin to the computational layer 502 and the functionality associated therewith. Operation 1601 is executed to retrieve trainer attribute association matrices from the database 110. Operation 1602 is executed to retrieve style matrix from the database 110. Operation 1603 is executed that calculates the difference between a trainer attribute associate matrix in each style matrix. Operation 1604 is executed that determines, or otherwise selects, the best matching style matrix. Operation 1605 is executed that calculates neighbors of the best matching matrix. A neighbor may be an adjacent matrix. Operation 1606 is executed that updates a matching style matrices neighbors to be more similar to the training attributes association matrix (e.g., the matrix system method illustrated herein is trained). Decisional operation 1607 is executed that determines whether or not there are remaining trainer attribute association matrices. In cases where a decisional operation 1607 evaluates to "yes," the operation 1603 is re-executed. In cases where decisional operation 1607 evaluates "no," the operation 1608 is executed. Operation 1608 when executed stores the updated style matrices into the database 110.

Figure 17:
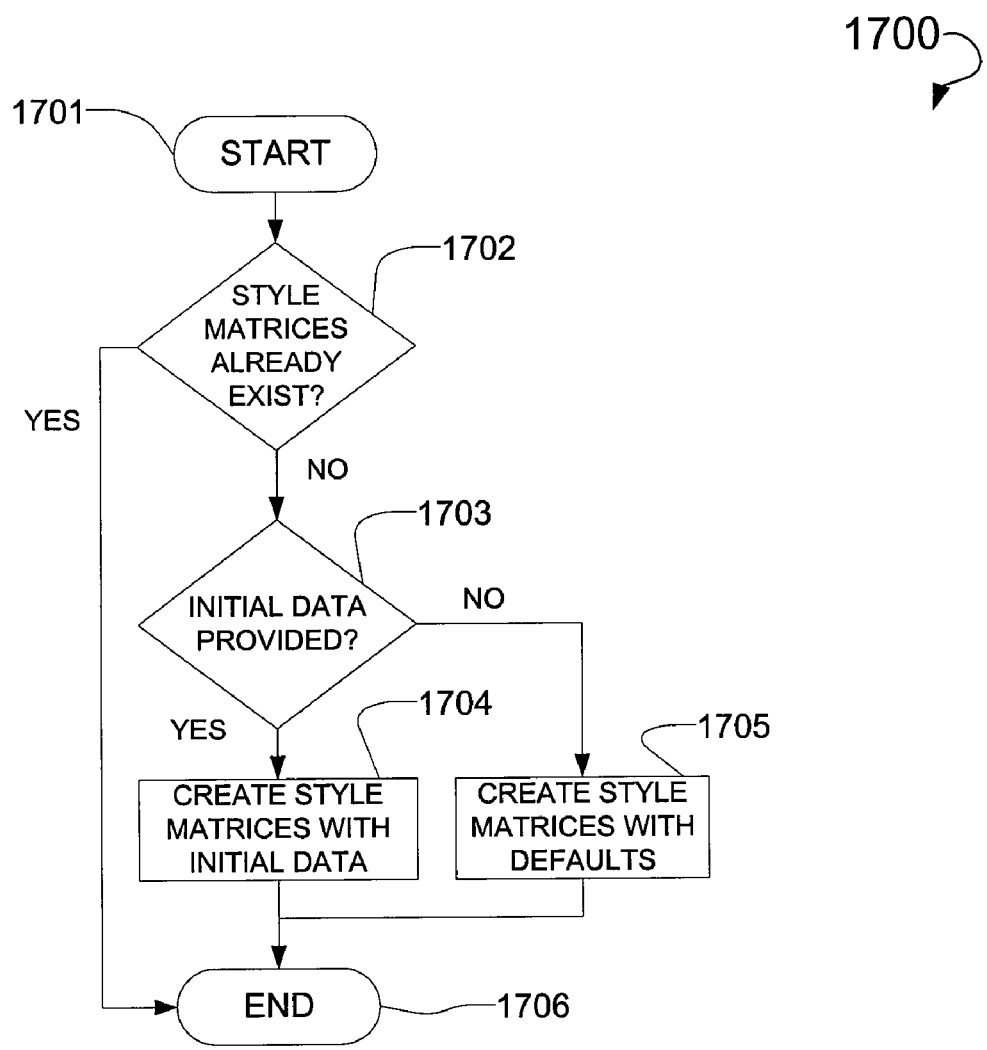
FIG. 17 is a flowchart illustrating a method, according to an example embodiment, used to initialize a computational layer of a neural network.

FIG. 17 is a flowchart illustrating the execution of an example method 1700 used to initialize a computational layer (e.g., computational layer 502) of a neural network. Method 1700 may be executed by the application server 109. Shown is an operation 1701 that facilitates the start of an initialization process for a neural network. Decisional operation 1702 is executed to determine whether or not style matrices already exist. In cases where decisional operation 1702 evaluates to "yes" determination operation 1706 is executed. In cases where decisional operation 1702 evaluates to "no" a further decisional operation 1703 is executed. Decisional operation 1703, when executed, determines whether or not an initial data has been provided. In cases where decisional operation 1703 evaluates to "no" an operation 1705 is executed. In cases where decisional operation 1703 evaluates to "yes" an operation 1704 is executed. Operation 1704, when executed, executed creates a style matrix with the initial data provided by the user 101. This initial data may be provided via a link as illustrated with FIG. 5. Operation 1705, when executed, creates a style matrix with defaults whereas these defaults may be a numeric value the operation 1706 is then executed.

Figure 18:
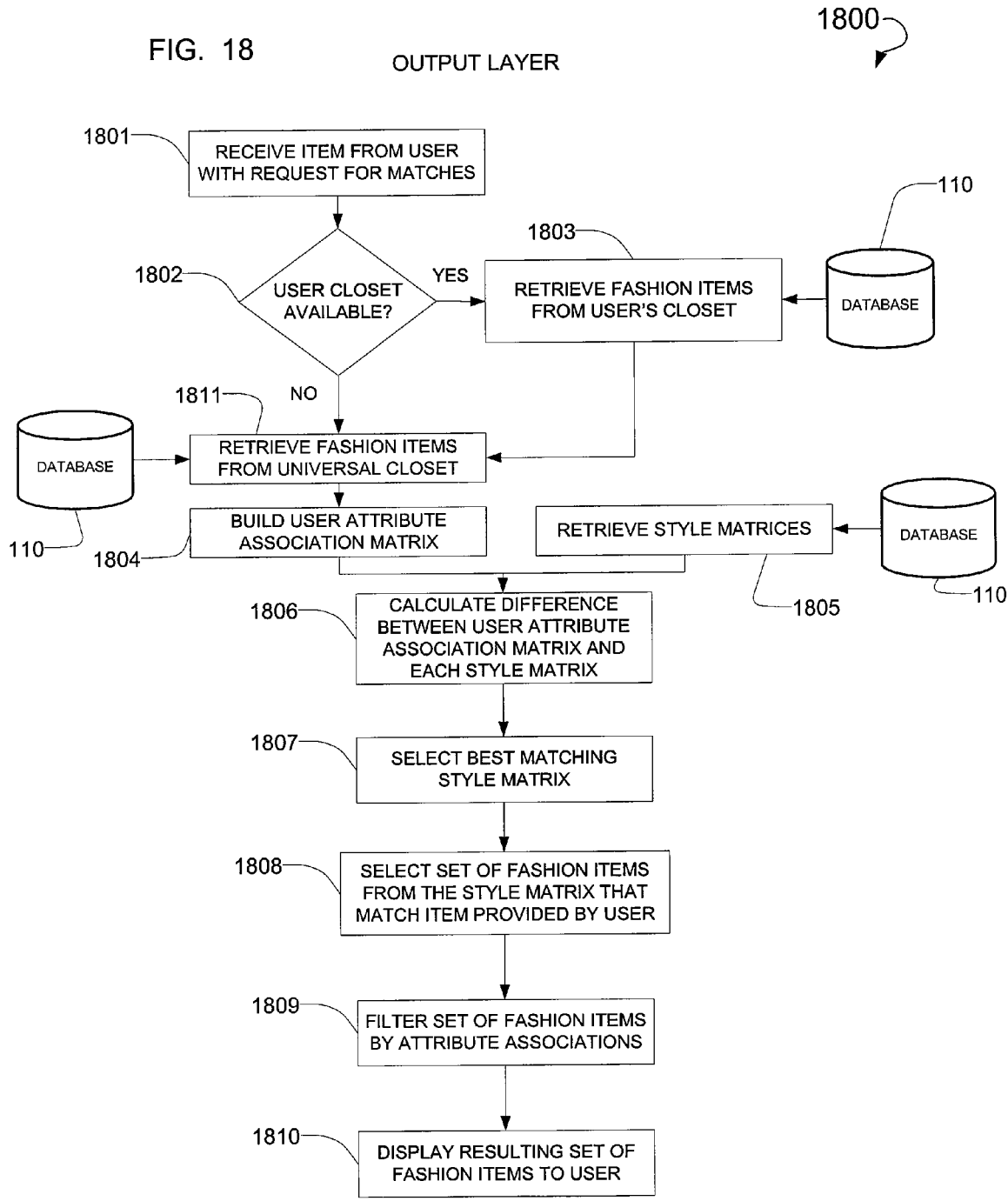
FIG. 18 is a flow chart illustrating the execution of an operation, according to an example embodiment, used to implement an output layer.

FIG. 18 is a flow chart illustrating the execution of example method 1800 used to implement the output layer 303. The example method 1800 may be implemented on the application server 100. Shown is an operation 1801 that receives an item from a user including requests for a match. This item may be provided via the previously illustrated outfit match request 212. Decisional operation 1802 is executed that determines whether or not a closet is available. This closet includes a digital closet or universal closet. In cases where decisional operation 1802 evaluates to "yes," an operation 1803 is executed. In cases where decisional operation 1802 evaluates to "no," an operation 1811 is executed. Operation 1803, when executed, retrieves a fashion item from the user's closet (e.g., a digital closet) this closet may reside upon the database 110. Operation 1811 is executed to retrieve fashion items from a universal closet, where this universal closet may reside upon, for example, the database 110. Operation 1804 when executed builds a user attribute association matrix. An operation 1805 is executed that retrieves style matrices from the database 110. Operation 1806 is executed to calculate the difference between a user attribute association matrix in each style matrix. Operation 1807 is executed to select the best matching style matrix. Operation 1808 is executed to select a set of fashion items from the style matrix set that match the items provided by the user. The items provided by the user may be provided as a part of a digital closet. Operation 1809 is executed to filters a set of fashion items by attribute associations. The filter is in the form of, for example, the previously referenced link or links (see e.g., FIG. 5). Operation 1810 is executed to display is a resulting sets of fashion items to users.

Example Database

Some embodiments may include the various databases (e.g., database 110) being relational databases, or, in some cases, Online Analytic Processing (OLAP)-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 19:
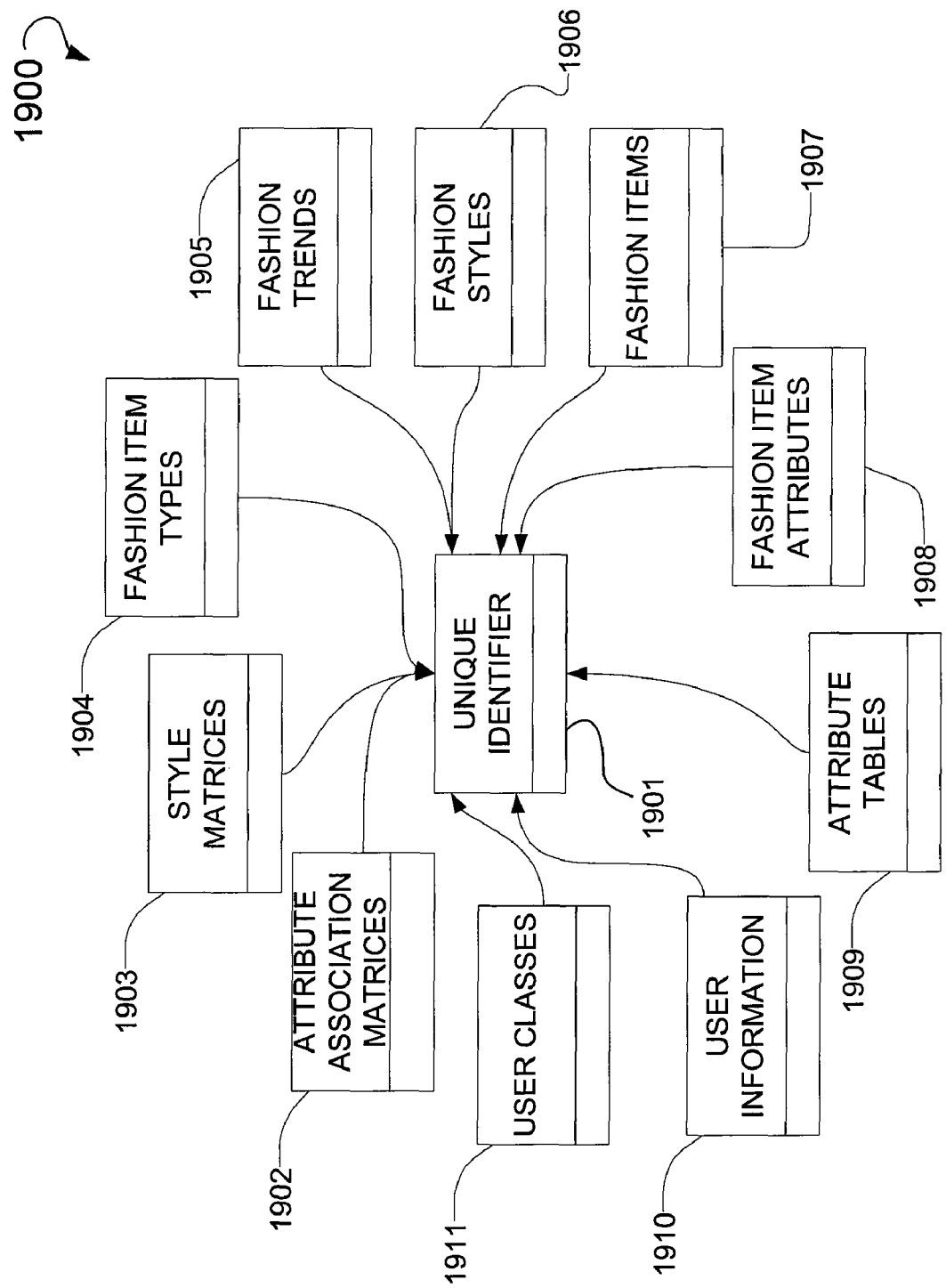
FIG. 19 is a diagram of a Relational Data Scheme (RDS), according to an example embodiment, to model data in a database.

FIG. 19 is a diagram of an example RDS 1900. Illustrated are a number of tables used in, for example, the database 110. Shown is a table 1903 that contains the style matrices. These style matrices may be stored, for example, as a Binary Large Objection (BLOB), an integer, a XML data type, or some other suitable data type. Table 1904 includes fashion item types where these fashion item types may include a string, XML, or other suitable data type. Table 1905 includes fashion trends where these fashion trends may include data stored as a BLOB, a string, or an XML data type. Table 1906 includes fashion styles where these fashion styles may be stored as, for example, a string, or XML data type. Table 1907 includes fashion items where these fashion items may be stored as a string, or XML data type. Table 1908 also includes fashion item attributes where these fashion item attributes may be stored as a string, or XML data type. Table 1909 includes attribute tables where these attribute tables may be stored as, for example, a XML data type, or other suitable data type. Table 1910 includes user information, this user information may be stored as a string, or XML data type. Table 1911 contains user classes where these user classes may be stored as a string, a BLOB or XML data type. Table 1902 includes attribute association matrices where these attribute association matrices may be stored as a BLOB or XML data type. The various data entries in the tables 1902 through 1911 may be accessed using a unique identifier key (e.g., a foreign key) that is stored in the table 1901. This key may be, for example, an integer value.

Component Design

Some example embodiments may include the above-illustrated operations being written as one or more software components. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. These components are linked to other components via various APIs and then compiled into one complete server and/or client application. The method for using components in the building of client and server applications is well known in the art. Further, these components may be linked together via various distributed programming protocols as distributed computing components.

Disturbed Computing Components and Protocols

Some example embodiments may include remote procedure calls being used to implement one or more of the above-illustrated components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A System of Transmission Between a Server and Client

Some embodiments may utilize the Open Systems Interconnection (OSI) model or Transmission Control Protocol (TCP)/IP protocol stack model for defining the protocols used by a network to transmit data. Operations that may utilize these various protocols include operations 1302, 1303, 1310, 1314, 1319, and 1320. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, LAN, WAN, or some other suitable network. In some cases, Internet refers to a network of networks. These networks may use a variety of protocols for the exchange of data, including the aforementioned TCP/IP, or some other suitable protocol. These networks may be organized within a variety of topologies (e.g., a star topology) or structures.

A Computer System

FIG. 20 shows a diagrammatic representation of a machine in the example form of a computer system 2000 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2000 includes a processor 2002 (e.g., a CPU, a Graphics Processing Unit (GPU) or both), a main memory 2001, and a static memory 2006, which communicate with each other via a bus 2008. The computer system 2000 may further include a video display unit 2010 (e.g., a Liquid Crystal Display (LCD) or a Cathode Ray Tube (CRT)). The computer system 2000 also includes an alphanumeric input device 2017 (e.g., a keyboard), a User Interface (UI) (e.g., GUI) cursor controller 2056 (e.g., a mouse), a drive unit 2071, a signal generation device 2077 (e.g., a speaker) and a network interface device (e.g., a transmitter) 2020.

The disk drive unit 2071 includes a machine-readable medium 2022 on which is stored one or more sets of instructions and data structures (e.g., software) 2021 embodying or used by any one or more of the methodologies or functions illustrated herein. The software instructions 2021 may also reside, completely or at least partially, within the main memory 2001 and/or within the processor 2002 during execution thereof by the computer system 2000, the main memory 2001 and the processor 2002 also constituting machine-readable media.

The instructions 2021 may further be transmitted or received over a network 2026 via the network interface device 2020 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, and optical and magnetic media.

Marketplace Applications

In some example embodiments, the system and method illustrated herein is implemented in a kiosk that resides within a retail store. Users may provide training data in the form of the match selection 112 to the kiosk. Further, the user may provide an item choice 214 to the kiosk (see FIGS. 1 and 2 generally). The user may then purchase fashion items from the retail store based upon the item choice 214. Additionally, as illustrated above, the user may provide a digital closet to the kiosk that includes fashion items that the user currently owns. Based upon this digital closet, an outfit match set 213 may be provided.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method that is implemented on a server comprising:
    receiving an item choice, using a receiver, that includes a fashion item;
    storing a style matrix from a neural network computer system, the style matrix generated through a threshold function that finds a difference between a first attribute association matrix and a second attribute association matrix, where this difference is less than or equal to a threshold value, and the neural network computer system to include a processor to train and a first memory coupled to the processor to train;
    matching the fashion item with an additional fashion item, using a matching engine including a processor to match and a second memory coupled to the processor to match, the additional fashion item selected from the style matrix, and the matching based upon an attribute of the fashion item; and
    transmitting, using a transmitter, the additional fashion item as part of an outfit match set.

2. The computer implemented method of claim 1, further comprising:
    selecting the fashion item, using a selection engine, from a digital closet;
    processing the fashion item, using a processor, to build the first attribute association matrix; and
    comparing the first attribute association matrix and the style matrix, using a comparison engine, to determine a match of the fashion item and the additional fashion item.

3. The computer implemented method of claim 1, wherein the style matrix is generated from the first attribute association matrix that includes the fashion item.

4. The computer implemented method of claim 1, wherein the first attribute association matrix and second attribute association matrix are used in an input layer of a neural network, and the style matrix is used in a computational layer of the neural network.

5. The computer implemented method of claim 4, further comprising building the first attribute association matrix including:
    randomly selecting the fashion item with a first fashion attribute;
    randomly selecting the additional fashion item with a second fashion attribute for the fashion item;
    selecting the additional fashion item that match the fashion item;
    numerically correlating of the fashion item with the first fashion attribute with and the additional fashion item with a second fashion attribute;
    building the first attribute association matrix using the numerical correlation and selected additional fashion item.

6. The computer implemented method of claim 1, further comprising filtering the fashion item and the additional fashion item using a filter that includes at least one of a color-to-color association filter, a price-to-price association filter, or a fabric-to-fabric association filter.

7. The computer implemented method of claim 6, wherein the filtering is conducted through a weighted link in the neural network.

8. The computer implemented method of claim 1, further comprising:
    matching the fashion item and the additional fashion item, using an additional matching engine, through comparing an image of the fashion item and an additional image of the additional fashion item based upon the images position relative to an area of a projection;
    transforming the images, using a transformation engine, into a same position; and
    training a neural network, using a training engine, to recognize the position.

9. The computer implemented method of claim 1, further comprising generating a prompt, using a prompt generation engine, to purchase the additional fashion item.

10. The computer implemented method of claim 1, wherein storing includes training the neural network using fashion attributes to generate the style matrix, wherein the neural network includes a processor to receive multiple inputs and to produce outputs and a first memory coupled to the processor to train.

11. A computer system comprising:
    a receiver to receive an item choice including a fashion item;
    a matching engine to receive a repeatedly updated style matrix from a neural network and to execute an algorithm to match the fashion item with an additional fashion item selected from the style matrix generated through a threshold function that finds a difference between a first attribute association matrix and a second attribute association matrix, where this difference is less than or equal to a threshold value and, the matching based upon an attribute; and
    a transmitter to transmit the additional fashion item as part of an outfit match set.

12. The computer system of claim 11, further comprising:
    a selection engine to select the fashion item from a digital closet;
    a processor to process the fashion item to build the first attribute association matrix; and
    a comparison engine to compare the first attribute association matrix and the style matrix to determine a match of the fashion item and the additional fashion item.

13. The computer system of claim 11, wherein the style matrix is generated from the first attribute association matrix that includes the fashion item.

14. The computer system of claim 11, wherein the first and second attribute association matrices are used in an input layer of the neural network, and the style matrix is used in a computational layer of the neural network.

15. The computer system of claim 11, further comprising a filter to filter the fashion item and the additional fashion item based upon a fashion item attribute.

16. The computer system of claim 15, wherein the filter is a weighted link in the neural network.

17. The computer system of claim 11, further comprising:
an additional matching engine to match the fashion item and the additional fashion item through comparing an image of the fashion item and an additional image of the additional fashion item based upon the images position relative to an area of a projection;
a transformation engine to transform the images into a same position; and
a training engine to train the neural network to recognize the position.

18. The computer system of claim 11, further comprising a prompt generation engine to generate a prompt to purchase the additional fashion item.

19. The computer system of claim 11, wherein the computer system is communicatively coupled to another computer system that includes at least one of a computer system, a cell phone, Personal Digital Assistant (PDA), or a Kiosk.

20. A tangible machine readable storage medium comprising instructions, which when implement by one or more machines, cause the one or more machines to perform the following operations:
receive an item choice including a fashion item;
match the fashion item with an additional fashion item selected from a style matrix generated by a neural network through a threshold function that finds a difference between a first attribute association matrix and a second attribute association matrix, where this difference is less than or equal to a threshold value and, the matching based upon an attribute; and
transmit the additional fashion item as part of an outfit match set.

* * * * *